United States Patent
Sugihara et al.

(10) Patent No.: US 12,361,708 B2
(45) Date of Patent: Jul. 15, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Kenji Sugihara, Tokyo (JP); Mari Saito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/884,399

(22) Filed: Sep. 13, 2024

(65) Prior Publication Data
US 2025/0005921 A1 Jan. 2, 2025

Related U.S. Application Data

(63) Continuation of application No. 18/740,616, filed on Jun. 12, 2024, which is a continuation of application (Continued)

(30) Foreign Application Priority Data

Aug. 7, 2018 (JP) ................................ 2018-148857

(51) Int. Cl.
*G06T 19/00* (2011.01)
*G02B 27/01* (2006.01)
*G06V 20/20* (2022.01)

(52) U.S. Cl.
CPC .......... *G06V 20/20* (2022.01); *G02B 27/017* (2013.01); *G06T 19/006* (2013.01); *G02B 2027/0138* (2013.01); *G02B 2027/014* (2013.01)

(58) Field of Classification Search
CPC .................. G06V 20/20; G02B 27/017; G02B 2027/0138; G02B 2027/014;
(Continued)

(56) References Cited

U.S. PATENT DOCUMENTS

| 10,607,413 B1 * | 3/2020 | Marcolina ................. G06T 7/74 |
| 2014/0168056 A1 | 6/2014 | Swaminathan et al. |

(Continued)

FOREIGN PATENT DOCUMENTS

| CA | 3105192 A1 * | 1/2020 | ........... G02B 27/017 |
| CN | 103377487 A | 10/2013 | |

(Continued)

OTHER PUBLICATIONS

International Search Report and Written Opinion of PCT Application No. PCT/JP2019/029877, issued on Oct. 29, 2019, 10 pages of English Translation and 08 pages of ISRWO.

(Continued)

*Primary Examiner* — Ping Y Hsieh
(74) *Attorney, Agent, or Firm* — XSENSUS LLP

(57) ABSTRACT

It is desirable to provide a technology making it possible to enhance noticeability of a virtual object. Provided is an information processing apparatus that includes a display controlling section that causes a display device to start displaying a first virtual object while a user is moving in a real space, performs distance keeping control to substantially keep a distance between the user and the first virtual object, ends the distance keeping control in a case where a predetermined condition is satisfied, and changes the distance between the user and the first virtual object.

20 Claims, 19 Drawing Sheets

Related U.S. Application Data

No. 17/250,513, filed as application No. PCT/JP2019/029877 on Jul. 30, 2019, now Pat. No. 12,033,380.

(58) Field of Classification Search
CPC .... G02B 2027/0181; G02B 2027/0187; G02B 27/0172; G06T 19/006; G06T 2219/004; G06F 3/01; G06F 3/0481; G06F 3/0484; G09G 5/00; G09G 5/14; G09G 5/36; G09G 5/38

See application file for complete search history.

(56) References Cited

U.S. PATENT DOCUMENTS

| | | | |
|---|---|---|---|
| 2015/0052479 A1* | 2/2015 | Ooi | G06F 3/0482 |
| | | | 715/810 |
| 2015/0070347 A1* | 3/2015 | Hofmann | G06F 3/0346 |
| | | | 345/419 |
| 2017/0060230 A1 | 3/2017 | Faaborg et al. | |
| 2017/0201709 A1 | 7/2017 | Igarashi et al. | |
| 2018/0174366 A1* | 6/2018 | Nishibe | G06F 3/013 |
| 2018/0240220 A1 | 8/2018 | Katori et al. | |
| 2019/0064528 A1 | 2/2019 | Fukazawa et al. | |
| 2019/0066630 A1 | 2/2019 | Fukazawa et al. | |

FOREIGN PATENT DOCUMENTS

| | | |
|---|---|---|
| CN | 106575299 A | 4/2017 |
| CN | 107533374 A | 1/2018 |
| CN | 107683497 A | 2/2018 |
| CN | 108027652 A | 5/2018 |
| CN | 108700982 A | 10/2018 |
| CN | 108885801 A | 11/2018 |
| JP | 2013-218597 A | 10/2013 |
| JP | 2014-225727 A | 12/2014 |
| JP | 2016-018367 A | 2/2016 |
| JP | 2017-182340 A | 10/2017 |
| JP | 2018-517967 A | 7/2018 |
| KR | 10-2017-0126508 A | 11/2017 |
| WO | 2016/017254 A1 | 2/2016 |
| WO | 2016/203792 A1 | 12/2016 |
| WO | 2011/047178 A1 | 3/2017 |
| WO | 2017/138212 A1 | 8/2017 |
| WO | 2017/169272 A1 | 10/2017 |

OTHER PUBLICATIONS

Notice of Allowance for U.S. Appl. No. 17/250,513, issued on Mar. 1, 2024, 07 pages.

Non-Final Office Action for U.S. Appl. No. 17/250,513, issued on Oct. 11, 2023, 08 pages.

International Preliminary Report on Patentability of PCT Application No. PCT/JP2019/029877, issued on Feb. 18, 2021, 10 pages of English Translation and 05 pages of IPRP.

* cited by examiner

INFORMATION PROCESSING APPARATUS, INFORMATION PROCESSING METHOD, AND PROGRAM

CROSS-REFERENCE TO RELATED APPLICATIONS

This application is a continuation application of U.S. patent application Ser. No. 18/740,616, filed on Jun. 12, 2024, which is a continuation application of U.S. patent application Ser. No. 17/250,513, filed on Jan. 31, 2021 (Now U.S. Pat. No. 12,033,380), which is a U.S. National Phase of International Patent Application No. PCT/JP2019/029877 filed on Jul. 30, 2019, which claims priority benefit of Japanese Patent Application No. JP 2018-148857 filed in the Japan Patent Office on Aug. 7, 2018. Each of the above-referenced applications is hereby incorporated herein by reference in its entirety.

TECHNICAL FIELD

The present disclosure relates to an information processing apparatus, an information processing method, and a program.

BACKGROUND ART

A technique to display a virtual object has been recently known. For example, a technique is disclosed for controlling the position of a virtual object in a depth direction on the basis of a user's behavior (refer to PTL 1, for example). Another technique is also disclosed for changing information visibility depending on a distance between a user and a virtual object (refer to PTL 2, for example).

CITATION LIST

Patent Literature

PTL 1: Japanese Unexamined Patent Application Publication No. 2014-225727
PTL 2: WO 2017/169272

SUMMARY OF THE INVENTION

Problems to be Solved by the Invention

However, it is desired to provide a technology that makes it possible to enhance noticeability of a virtual object.

Means for Solving the Problem

According to the present disclosure, an information processing apparatus including a display controlling section is provided. The display controlling section causes a display device to start displaying a first virtual object while a user is moving in a real space, performs distance keeping control to substantially keep a distance between the user and the first virtual object, ends the distance keeping control in a case where a predetermined condition is satisfied, and changes that distance between the user and the first virtual object.

According to the present disclosure, an information processing method is provided that includes: causing a display device to start displaying a first virtual object while a user is moving in a real space; performing distance keeping control to substantially keep a distance between the user and the first virtual object; ending the distance keeping control in a case where a predetermined condition is satisfied; and changing the distance between the user and the first virtual object.

According to the present disclosure, a program causing a computer to function as an information processing apparatus is provided. The information processing apparatus includes a display controlling section that causes a display device to start displaying a first virtual object while a user is moving in a real space, performs distance keeping control to substantially keep a distance between the user and the first virtual object, ends the distance keeping control in a case where a predetermined condition is satisfied, and changes the distance between the user and the first virtual object.

Effect of the Invention

According to the present disclosure described above, there is provided a technology that makes it possible to enhance noticeability of a virtual object. It is to be noted that the above-described effects are not necessarily limitative. In addition to or in place of the above effects, there may be achieved any of the effects described in the present specification or other effects that may be grasped from the present specification.

MODES FOR CARRYING OUT THE INVENTION

Figure 1:
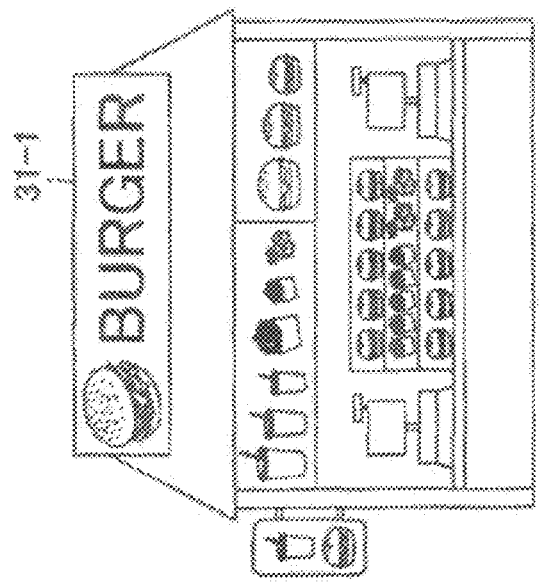
FIG. 1 is a diagram illustrating an example configuration of an information processing system according to an embodiment of the present disclosure.
Figure 1:
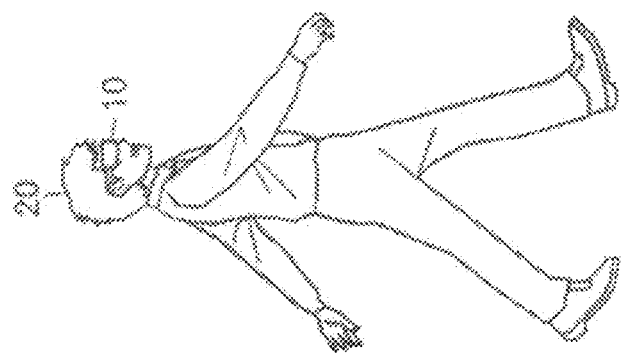

Hereinafter, preferred embodiments of the present disclosure are described in detail with reference to the accompanying drawings. It is to be noted that, in the present specification and drawings, repeated description is omitted for components having substantially the same functional configuration by assigning the same reference signs.

Further, in the present specification and drawings, a plurality of components having substantially the same or similar functional configuration are distinguished by adding different numbers to the ends of their reference signs in some cases. It is to be noted that only the same reference sign is assigned to a plurality of components having substantially the same or similar functional configuration in a case where there is no particular need to distinguish them. Additionally, similar components described in different embodiments are distinguished by adding different alphabet characters to the end of the same reference sign. It is to be noted that only the same reference sign is assigned to the similar components in a case where there is no particular need to distinguish them.

It is to be noted that the description is given in the following order.

0. Outline
1. Detailed Description of Embodiments
1.1. Example System Configuration
1.2. Example Functional Configuration of Information Processing Apparatus
1.3. Example of Various Information
2. Detailed Description of First Embodiment
2.1. Detailed Description of Function of Information Processing Apparatus
2.2. Operation of Information Processing Apparatus
2.3. Various Modification Examples
3. Detailed Description of Second Embodiment
3.1. Detailed Description of Function of Information Processing Apparatus
3.2. Operation of Information Processing Apparatus
3.3 Various Modification Examples
4. Example Hardware Configuration
5. Conclusion

0. Outline

First, the outline of an embodiment of the present disclosure is described. A technique for displaying a virtual object has been recently known. For example, a technique is disclosed for controlling the position of a virtual object in a depth direction on the basis of a user's behavior. Another technique is also disclosed for changing information visibility depending on a distance between a user and a virtual object. Hereinafter, a technology that makes it possible to enhance noticeability of a virtual object is mainly described.

Specifically, distance keeping control that substantially keeps a distance between a user and a first virtual object is performed in the embodiment of the present disclosure. Additionally, when a predetermined condition is satisfied, the distance keeping control ends, and the distance between the user and the first virtual object is changed. The distance between the user and the first virtual object is thereby kept until the predetermined condition is satisfied, whereas the distance between the user and the first virtual object is changed after the predetermined condition is satisfied. This makes it possible to enhance noticeability of the first virtual object.

The outline of the embodiment of the present disclosure has been described above.

1. Detailed Description of Embodiments

Embodiments of the present disclosure will now be described in detail.

1.1 Example System Configuration

First, an example configuration of an information processing system according to an embodiment of the present disclosure will now be described with reference to the drawings. FIG. 1 is a diagram illustrating an example configuration of the information processing system according to the embodiment of the present disclosure. As illustrated in FIG. 1, the information processing system according to the embodiment of the present disclosure includes an information processing apparatus 10. The information processing apparatus 10 is used by a user 20.

It is to be noted that mainly described in this embodiment is a case where the information processing apparatus 10 is a head mounted display (HMD) to be worn on the head of the user 20. In a case where the information processing apparatus 10 is an HMD, it is possible to easily move the field of view regardless of a limitation on the angle of view, if any. Particularly, mainly described in this embodiment is a case where the information processing apparatus 10 is a see-through HMD. However, the information processing apparatus 10 is not limited to the HMD. For example, the information processing apparatus 10 may be a smartphone, a mobile phone, a tablet device, a camera, a personal computer (PC), or another device.

The user 20 is able to visually recognize the real space. In an example illustrated in FIG. 1, the information processing apparatus 10 forms a field of view, and the user 20 is able to visually recognize the real space through the field of view. Any object may be present in the real space. In the example illustrated in FIG. 1, a real object 31-1 (eatery) is present as an example object in the real space. However, the real object 31-1 (eatery) is a mere example of the object. Another object may thus be present in the real space in place of the real object 31-1 (eatery).

The example configuration of the information processing system according to the embodiment of the present disclosure has been described above.

1.2. Example Functional Configuration of Information Processing Apparatus

Figure 2:
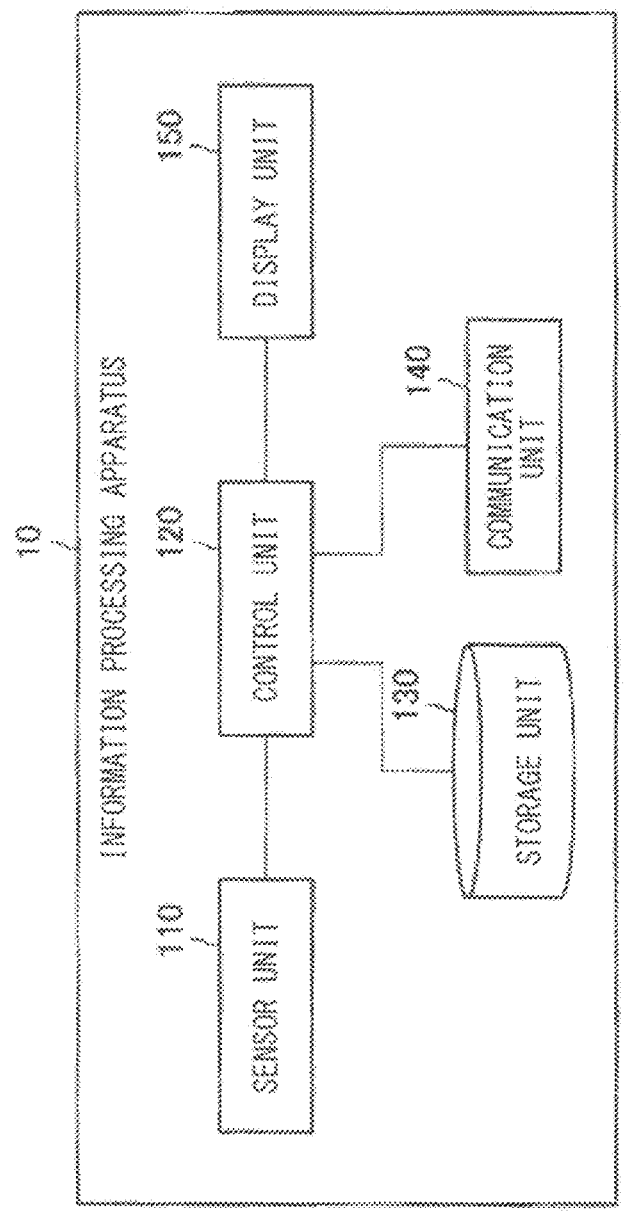
FIG. 2 is a diagram illustrating an example functional configuration of an information processing apparatus.

Next, an example functional configuration of the information processing apparatus 10 is described. FIG. 2 is a diagram illustrating an example functional configuration of the information processing apparatus 10. As illustrated in FIG. 2, the information processing apparatus 10 includes a sensor unit 110, a control unit 120, a storage unit 130, a communication unit 140, and a display unit 150. Additionally, the information processing apparatus 10 may be coupled to a server apparatus (not shown) via a communication network. The communication network includes the internet, for example.

The sensor unit 110 includes a sensor that detects user's behavior information. The user's behavior information may include a history of user's actions (e.g., walking, taking a train), a trend in user's behavior estimated from the action history, user's motions, a time when the user is present (e.g., current time), a position of the user (e.g., current position of the user), a line of site of the user, user's biological information, user's voice, or the like. For example, in a case where the sensor unit 110 includes at least one of an acceleration sensor or a gyroscope sensor, the action history and the movement of the user may be detected on the basis of at least one of the acceleration sensor or the gyroscope sensor.

Additionally, in a case where the sensor unit 110 includes a clock, the time when the user is present may be detected by the clock. In a case where the sensor unit 110 includes a position sensor (e.g., a global positioning system (GPS) sensor), the position of the user (e.g., the current position of the user) may be detected by the position sensor.

Additionally, in a case where the sensor unit 110 includes an image sensor, the line of sight of the user may be detected on the basis of an image captured by the image sensor. In this embodiment, it is mainly assumed that a central position of a pupil and a position relation of a Purkinje image are detected from the image captured by the image sensor and that the line of sight of the user is detected on the basis of the position relation. However, the line of sight of the user may be detected by any method. For example, the posture of the user's head may be detected as the line of sight of the user.

Additionally, in a case where the sensor unit 110 includes a biological sensor, the biological information may be detected by the biological sensor. For example, in a case where the biological sensor includes a brain wave sensor, the biological information may contain a brain wave detected by the brain wave sensor. For example, in a case where the sensor unit 110 includes a microphone, a voice of the user may be detected by the microphone.

Additionally, the sensor unit 110 has a function of detecting the position and posture of the user's head (the sensor unit 110). For example, the sensor unit 110 may include a position sensor (e.g., a global positioning system (GPS) sensor), and the position of the user's head may be detected by the position sensor, as in the case where the position of the user is detected.

Additionally, the sensor unit 110 may include a geomagnetic sensor, and the posture of the user's head may be detected by the geomagnetic sensor. Further, the sensor unit 110 may detect the posture of the user's head more accurately on the basis of at least one of the acceleration sensor or the gyroscope sensor, in addition to the geomagnetic sensor or in place of the geomagnetic sensor. Alternatively, in a case where a camera is disposed outside the information processing apparatus 10, an orientation of the face or body recognized from an image captured by the camera may be detected as the posture of the user's head.

The communication unit 140 includes a communication circuit and has a function of acquiring data from the server apparatus (not shown) coupled to the communication network and providing data to the server apparatus (not shown) via the communication network. For example, the communication unit 140 includes a communication interface. It is to be noted that one or more communication networks may be coupled to the server apparatus (not shown).

The storage unit 130 includes a memory. The storage unit 130 is a recording medium that stores programs to be executed by the control unit 120 and data necessary for execution of these programs. Additionally, the storage unit 130 temporarily stores data for calculation by the control unit 120. The storage unit 130 includes a magnetic storage device, a semiconductor storage device, an optical storage device, a magneto-optical storage device, or the like.

The display unit 150 has a function of displaying various images. The type of the display unit 150 should not be limited. For example, the display unit 150 may be any display that displays an image visually recognizable by the user. The display unit 150 may be a liquid crystal display or an organic electro-luminescence (EL) display.

The control unit 120 executes control of each component of the information processing apparatus 10. The control unit 120 may include, for example, one or more central processing units (CPU) or the like. In a case where the control unit 120 includes a processing unit such as the CPU, the processing unit may include an electronic circuit. The control unit 120 may be implemented by executing a program by the processing unit.

Figure 3:
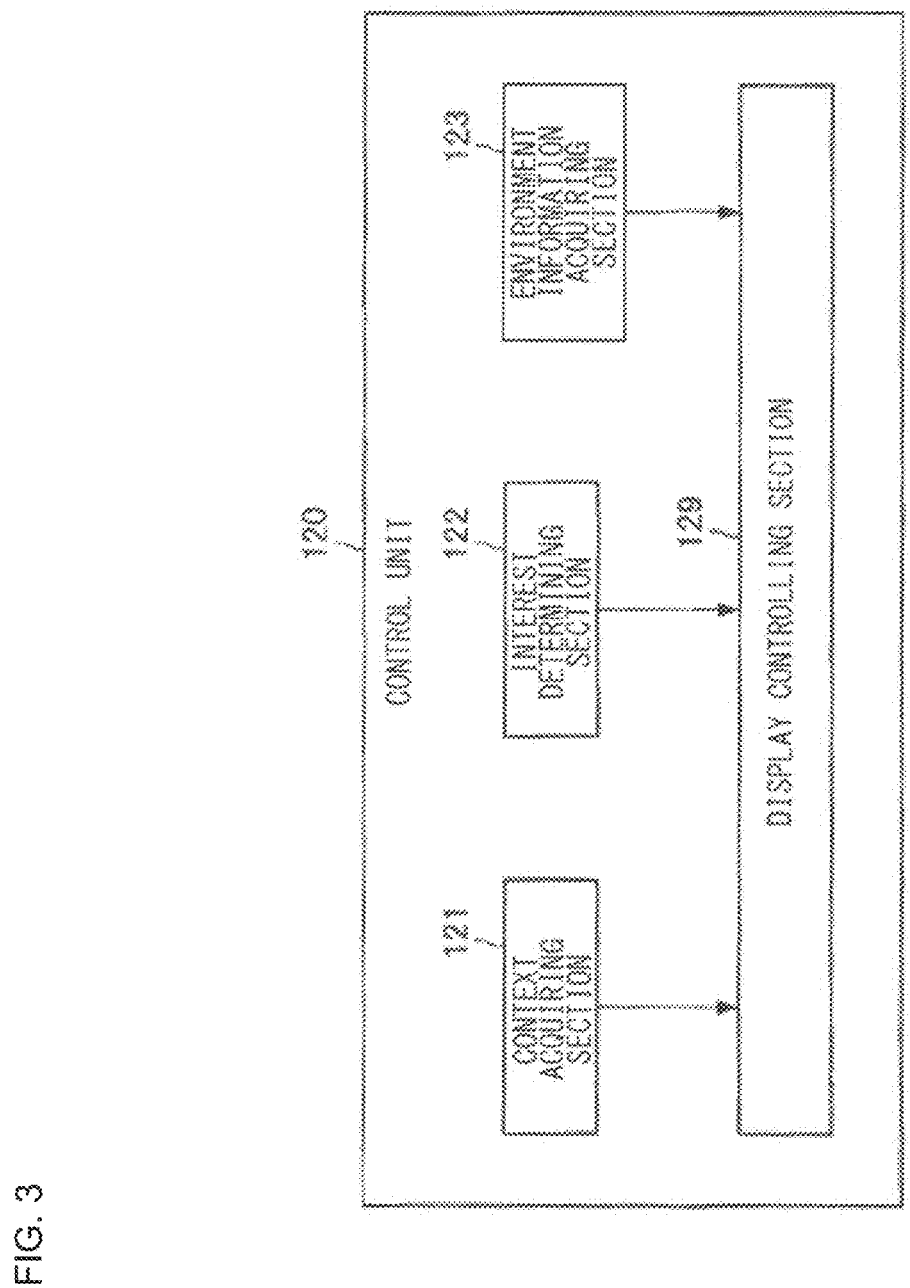
FIG. 3 is a diagram illustrating a detailed example configuration of a control unit.

FIG. 3 is a diagram illustrating a detailed example configuration of the control unit 120. As illustrated in FIG. 3, the control unit 120 includes a context acquiring section 121, an interest determining section 122, an environment information acquiring section 123, and a display controlling section 129. Details of these functional blocks are described below.

The example functional configuration of the information processing apparatus 10 according to the embodiment has been described above.

1.3. Examples of Various Information

Figure 4:
FIG. 4 is a diagram illustrating an example configuration of a virtual-object definition information.
Figure 5:
FIG. 5 is a diagram illustrating an example configuration of map information.

Various information used for controlling a virtual object is described with reference to FIGS. 4 and 5. In FIGS. 4 and 5, virtual-object definition information 131 and map information 135 are described as examples of the various information used for controlling the virtual object. The various information used for controlling the virtual object is stored in the storage unit 130, and may be retrieved for use from the storage unit 130 when needed.

FIG. 4 is a diagram illustrating an example configuration of the virtual-object definition information 131. As illustrated in FIG. 4, the virtual-object definition information 131 includes a context and a virtual object in connection with the context. For example, the context may include the above-described behavior information (e.g., a history of user's actions (which may include a current action), a trend in user's behavior, user's motions, a time when the user is present (e.g., current time), a position of the user (e.g., current position of the user), a line of sight of the user, user's biological information, user's voice, etc.). The behavior information may further include information on user's schedule (e.g., information indicating a user's schedule-what to do and when to do) and a user's profile (e.g., sex, age, hobby of the user, etc.).

FIG. 5 is a diagram illustrating an example configuration of the map information 135. As illustrated in FIG. 5, the map information 135 includes sensor data and real-object information in connection with the sensor data. Examples of the sensor data include position information (e.g., latitude, longitude, etc.) of the user. Additionally, examples of the real-object information include information on type of the real object. In this embodiment, the type of the real object should not be limited. For example, the type of the real object may be the type of a store (e.g., convenience store, cafe, eatery, etc.) or the type of a facility (e.g., station, etc.).

The examples of the various information used for controlling the virtual object have been described above.

In this embodiment, the display controlling section 129 in the information processing apparatus 10 causes the display unit (display device) 150 to start displaying a first virtual object while the user is moving in the real space, and performs the distance keeping control that substantially keeps a distance between the user and the first virtual object. Thereafter, when a predetermined condition is satisfied, the display controlling section 129 ends the distance keeping control and changes the distance between the user and the first virtual object.

According to the configuration, it is possible to enhance the noticeability of the first virtual object by controlling the distance between the user and the first virtual object.

2. Detailed Description of First Embodiment

First, a first embodiment of the present disclosure is described in detail.

In the first embodiment of the present disclosure, the first virtual object indicates information relevant to a predetermined position in the real space. Specifically, in the first embodiment of the present disclosure, an eatery, which is an example of a real object, is present at a predetermined position in the real space. Alternatively, a real object other than the eatery may be present at the predetermined position in the real space. Additionally, in the first embodiment of the present disclosure, the information relevant to the predetermined position includes information on the shop present at the predetermined position (e.g., recommended menu of the eatery). Alternatively, the information relevant to the predetermined position may include information relevant to any real object (e.g., facility, etc.) present at the predetermined position.

2.1. Detailed Description of Function of Information Processing Apparatus

Functions of the information processing apparatus 10 according to the first embodiment of the present disclosure will now be described in detail. Hereinafter, the functions of the information processing apparatus 10 according to the first embodiment of the present disclosure are described in detail with reference to FIGS. 6 to 12 (and FIGS. 1 to 5 as appropriate).

Figure 6:
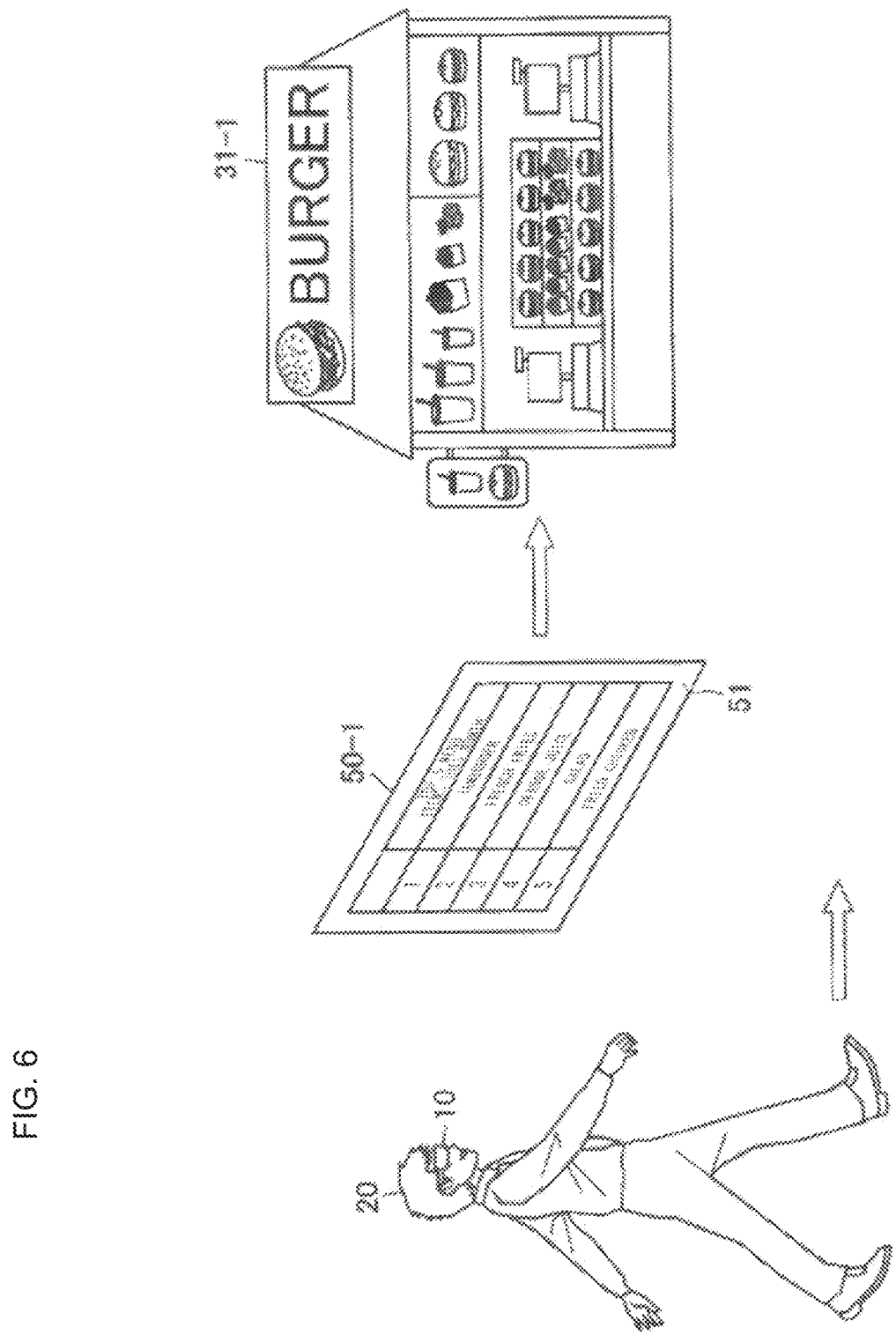
FIG. 6 is a diagram for describing example control of a virtual object according to a first embodiment of the present disclosure.

FIGS. 6 to 12 are diagrams each illustrating example control of the virtual object according to the first embodiment of the present disclosure. With reference to FIG. 6, the information processing apparatus 10 forms a field of view of the user 20. The real object 31-1 (eatery) is present in the real space, and the real object 31-1 (eatery) is preset in the field of view of the user 20. The user 20 is moving toward to the real object 31-1 (eatery).

Note that, in this embodiment, it is assumed that the user is moving on foot. However, the movement of the user should not be limited to walking. For example, the user may move using a vehicle (e.g., bicycle, car, etc.).

Additionally, information in which the type of a real object is connected with position information of the real object is stored as the map information 135 (FIG. 5). Further, it is assumed that the information in which a context, "the current position of the user has been moved to a position remote from the position of the eatery by a predetermined distance" is connected with the virtual object (recommended menu of the eatery) is stored as the virtual-object definition information 131 (FIG. 4). The virtual object (recommended menu of the eatery) may correspond to the first virtual object described above.

In this case, the environment information acquiring section 123 acquires environment information. More specifically, when the sensor unit 110 detects the position and posture of the user 20, the environment information acquiring section 123 may acquire, as the environment information, a relative position relation between the user 20 and the real object 31-1 (eatery) on the basis of the position and posture of the user 20 and the map information 135 (FIG. 5). For example, the relative position relation is the position of the real object 31-1 (eatery) in the field of view of the user 20.

The relative position relation between the user 20 and the real object 31-1 (eatery) may be acquired by any method. For example, the relative position relation between the user 20 and the real object 31-1 (eatery) may be recognized directly from a captured image of the field of view of the user 20. Further, the environment information should not be limited to the relative position relation between the user 20 and the real object 31-1 (eatery). For example, the environment information may be an environmental sound detected in the environment surrounding the user 20 by a microphone, or may be illuminance detected by an illuminance sensor.

On the basis of the environment information, the context acquiring section 121 acquires the movement of the position (current position) of the user 20 to the position remote from the position of the real object 31-1 (eatery) by the predetermined distance. When the context acquiring section 121 acquires the movement of the position (current position) of the user 20 to the position remote from the position of the real object 31-1 (eatery) by the predetermined distance, the display controlling section 129 acquires the virtual object (recommended menu of the eatery) corresponding to the context, "the position (current position) of the user has been moved to the position remote from the position of the eatery by the predetermined distance", on the basis of the virtual-object definition information 131 (FIG. 4).

As illustrated in FIG. 6, the display controlling section 129 causes the display unit 150 to start displaying the virtual object (recommended menu of the eatery) as a virtual object 50-1 (recommended menu of the eatery) in the field of view of the user 20, while the user 20 is moving in the real space (on the basis of determination that the user 20 is moving in the real space).

In this embodiment, the position of the virtual object 50-1 (recommended menu of the eatery) in the field of view should not be limited. For example, the display controlling section 129 causes the display unit 150 to display the virtual object 50-1 (recommended menu by the eatery) substantially in front of the user. That is, the virtual object 50-1 (recommended menu of the eatery) may be displayed straight in front of the user 20 or may be displayed at a position laterally in front of the user 20 (left-front of the user 20 in the example illustrated in FIG. 6) so as not to hinder the user 20 from walking. For example, the position laterally in front of the user 20 may be present within a peripheral field of view.

The attitude of the virtual object 50-1 (recommended menu of the eatery) should also not be limited. For example, the display controlling section 129 may keep the attitude of the virtual object 50-1 (recommended menu of the eatery) such that a surface of the virtual object 50-1 (recommended menu of the eatery) on which the information is provided (i.e., a front face 51 of the virtual object 50-1 (recommended menu of the eatery)) is substantially perpendicular to a direction from the user 20 to the virtual object 50-1 (recommended menu of the eatery), in order to allow the user 20 to easily visually recognize the virtual object 50-1 (recommended menu of the eatery).

It is to be noted that, in the example illustrated in FIG. 6, the number of the virtual objects (first virtual objects) displayed in the field of view of the user 20 is one. However, the number of the virtual objects (first virtual objects) displayed in the field of view of the user 20 should not be limited to one. For example, the number of the virtual objects (first virtual objects) displayed in the field of view of the user 20 may be two or more.

For example, to cause the display unit 150 to display two or more virtual objects (first virtual objects), the display controlling section 129 may control the timing or the position (or attitude) at which the two or more virtual objects (first virtual objects) are displayed such that the two or more virtual objects (first virtual objects) are not visually recognized by the user 20 as being overlapped with one another. For example, the display controlling section 129 may cause the two or more virtual objects (first virtual objects) to be displayed at different timings, or may change the position (or attitude) of at least one of the two or more virtual objects (first virtual objects). This facilitates separate control of the respective virtual objects (first virtual objects).

Figure 7:
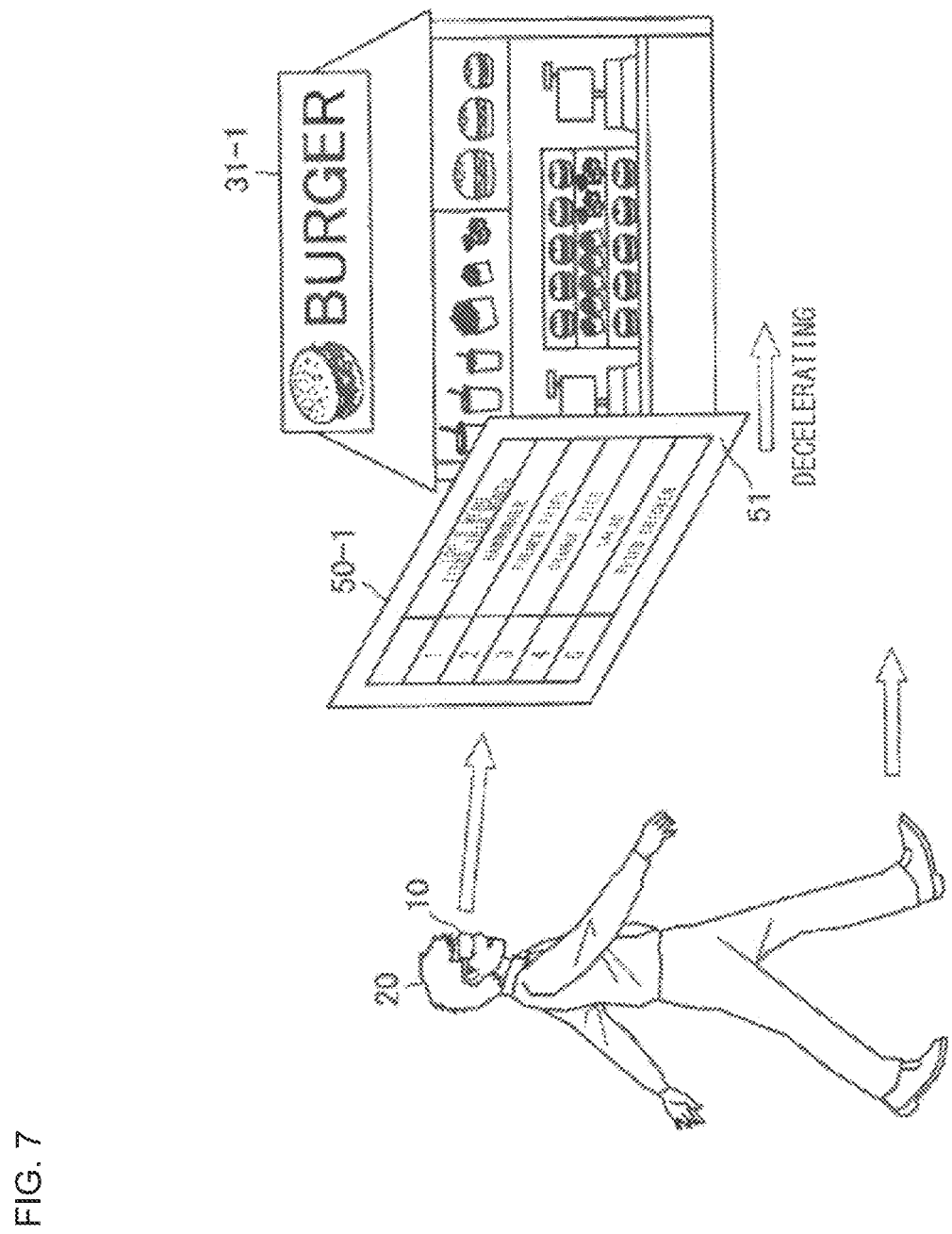
FIG. 7 is a diagram for describing the example control of the virtual object according to the first embodiment.

As the user 20 keeps walking, the user 20 comes closer to the real object 31-1 (eatery) in an example illustrated in FIG. 7 than the example illustrated in FIG. 6. At this time, the display controlling section 129 performs the distance keeping control that substantially keeps the distance between the user 20 and the virtual object 50-1 (recommended menu of the eatery). Thus, the distance between the user 20 and the virtual object 50-1 (recommended menu of the eatery) is not substantially changed.

It is to be noted that the display controlling section 129 may set the same distance between the user 20 and the virtual object 50-1 (recommended menu of the eatery) regardless of the moving speed of the user 20. However, the user 20 is likely to visually recognize a farther position as the moving speed increases. Accordingly, the display controlling section 129 may perform the distance keeping control such that the distance between the user 20 and the virtual object 50-1 (recommended menu of the eatery) becomes larger as the moving speed of the user 20 increases.

When a predetermined condition is satisfied, the display controlling section 129 ends the distance keeping control that substantially keeps the distance between the user 20 and the virtual object 50-1 (recommended menu of the eatery). Thereafter, the display controlling section 129 changes the distance between the user 20 and the virtual object 50-1 (recommended menu of the eatery). The predetermined condition may include a condition that the user 20 has come closer to the position of the real object 31-1 (eatery) (the predetermined position).

Hereinafter, it is assumed that the distance between the user 20 and the virtual object 50-1 (recommended menu of the eatery) is reduced when the distance between the user 20 and the real object 31-1 (eatery) becomes shorter than a first distance. Additionally, hereinafter, it is assumed that the distance between the user 20 and the virtual object 50-1 (recommended menu of the eatery) is increased when the distance between the user 20 and the real object 31-1 (eatery) becomes shorter than a second distance (smaller than the first distance). It is to be noted that a condition that the virtual object 50-1 (recommended menu of the eatery) has been displayed for a predetermined period of time may be used in place of the condition that the user 20 has come closer to the position of the real object 31-1 (eatery).

When the distance between the user 20 and the real object 31-1 (eatery) becomes shorter than the first distance, the interest determining section 122 determines whether the user 20 has an interest in the virtual object 50-1 (recommended menu of the eatery). Whether the user 20 has an interest in the virtual object 50-1 (recommended menu of the eatery) may be determined by any method. For example, the interest determining section 122 may determine whether the user 20 has an interest in the virtual object 50-1 (recommended menu of the eatery) on the basis of whether the line of sight of the user 20 has moved toward the virtual object 50-1 (recommended menu of the eatery).

The display controlling section 129 reduces the distance between the virtual object 50-1 (recommended menu of the eatery) and the user 20 on the basis of the determination that the user 20 has an interest in the virtual object 50-1 (recommended menu of the eatery). In the example illustrated in FIG. 7, the interest determining section 122 determines that the user 20 has an interest in the virtual object 50-1 (recommended menu of the eatery) because the user 20 has moved his/her line of sight toward the virtual object 50-1 (recommended menu of the eatery).

In such a case, as illustrated in FIG. 7, the display controlling section 129 may reduce the distance between the virtual object 50-1 (recommended menu of the eatery) and the user 20. That is, the display controlling section 129 may decelerate the virtual object 50-1 (recommended menu of the eatery).

It is to be noted that the display controlling section 129 may unconditionally reduce the distance between the virtual object 50-1 (recommended menu of the eatery) and the user 20 in a case where the user 20 has an interest in the virtual object 50-1 (recommended menu of the eatery). Alternatively, the display controlling section 129 may reduce the distance between the virtual object 50-1 (recommended menu of the eatery) and the user 20 in a case where the user 20 has an interest in the virtual object 50-1 (recommended menu of the eatery) and where a condition that the user 20 is sufficiently able to keep walking.

For example, the display controlling section 129 may estimate a time or distance in which the user 20 is able to keep walking on the basis of the environment information (the relative position relation between the user 20 and the real object). For example, the display controlling section 129 may specify an area in which the user 20 is allowed to walk by excluding an area in which the user 20 is not allowed to walk (e.g., rivers, expressways, etc.) from the real space on the basis of the environment information, and may estimate the time or distance in which the user 20 is able to keep walking on the basis of the area in which the user 20 is allowed to walk. Thereafter, the display controlling section 129 may reduce the distance between the virtual object 50-1 (recommended menu of the eatery) and the user 20 in a case where the time or distance in which the user 20 is able to keep walking becomes greater than a threshold.

In the example illustrated in FIG. 7, the display controlling section 129 maintains a constant amount of information of the virtual object 50-1 (recommended menu of the eatery)

while reducing the distance between the virtual object 50-1 (recommended menu of the eatery) and the user 20. However, the display controlling section 129 may increase the amount of information of the virtual object 50-1 (recommended menu of the eatery) while reducing the distance between the virtual object 50-1 (recommended menu of the eatery) and the user 20, in order to enhance the interest of the user 20 in the virtual object 50-1 (recommended menu of the eatery).

It is preferred that the display controlling section 129 changes the attitude of the virtual object 50-1 (recommended menu of the eatery) such that the attitude of the virtual object 50-1 (recommended menu of the eatery) relative to the user 20 is maintained while reducing the distance between the user 20 and the virtual object 50-1 (recommended menu of the eatery). Maintaining the attitude of the virtual object 50-1 (recommended menu of the eatery) relative to the user 20 allows the user 20 to easily visually recognize the virtual object 50-1 (recommended menu of the eatery).

Figure 8:
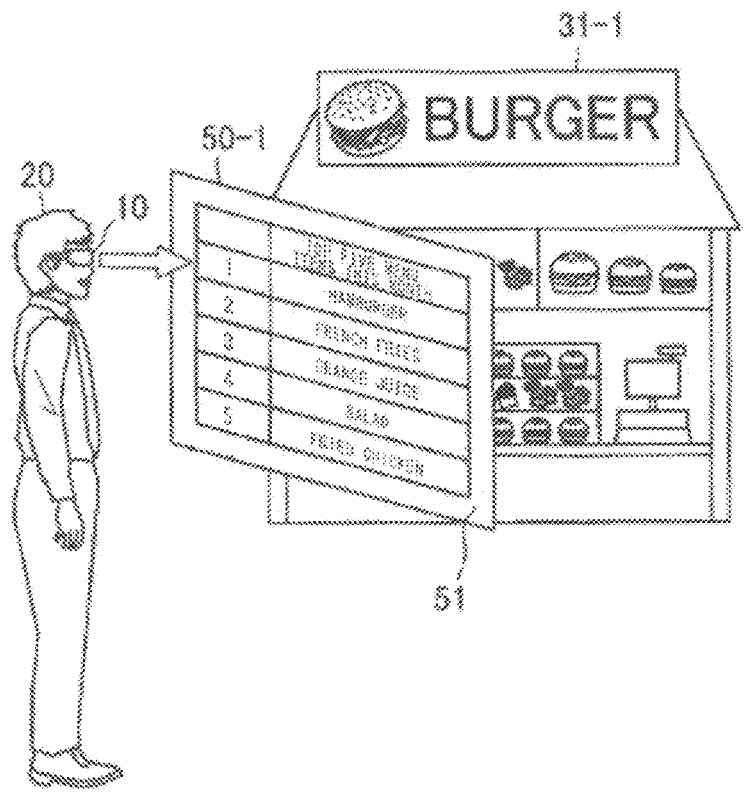
FIG. 8 is a diagram for describing the example control of the virtual object according to the first embodiment.

For example, as illustrated in FIG. 8, the display controlling section 129 may keep the attitude of the virtual object 50-1 (recommended menu of the eatery) such that the front face 51 of the virtual object 50-1 (recommended menu of the eatery) is substantially perpendicular to the direction from the user 20 to the virtual object 50-1 (recommended menu of the eatery) while reducing the distance between the virtual object 50-1 (recommended menu of the eatery) and the user 20.

In an example illustrated in FIG. 8, the distance between the virtual object 50-1 (recommended menu of the eatery) and the user 20 is shorter than that in the example illustrated in FIG. 7. Further, in the example illustrated in FIG. 8, the attitude of the virtual object 50-1 (recommended menu of the eatery) is changed from that in the example illustrated in FIG. 7 while the attitude of the virtual object 50-1 (recommended menu of the eatery) relative to the user 20 is maintained.

If the user 20 has a strong interest in the virtual object 50-1 (recommended menu of the eatery), the moving speed of the user 20 is considered to decrease while the distance between the virtual object 50-1 (recommended menu of the eatery) and the user 20 is reduced. In a case where the user 20 has a strong interest in the virtual object 50-1 (recommended menu of the eatery), the display controlling section 129 may cause the display unit 150 to display a virtual object (second virtual object) relevant to the virtual object 50-1 (recommended menu of the eatery).

Figure 9:
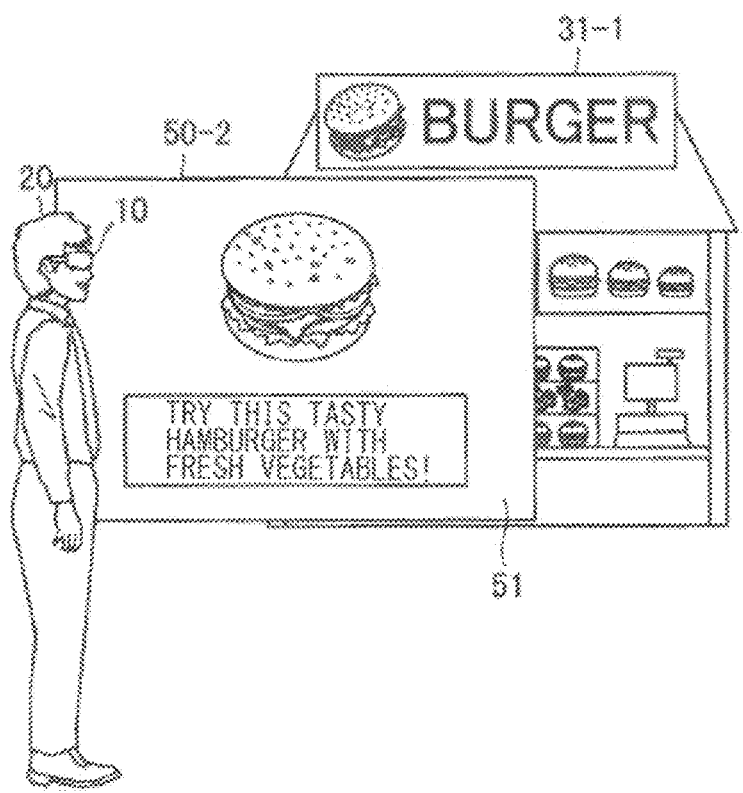
FIG. 9 is a diagram for describing the example control of the virtual object according to the first embodiment.

In an example illustrated in FIG. 9, a virtual object 50-2 (details of the menu) is displayed as an example of the virtual object (second virtual object). In this embodiment, it is assumed that the virtual object 50-2 (details of the menu) is a detail of the menu "hamburger" of the virtual object 50-1 (recommended menu of the eatery) (FIG. 8) to which the line of sight of the user 20 is directed. However, the virtual object (second virtual object) should not be limited.

For example, the virtual object (second virtual object) may include navigation information based on the current position of the user 20 and the position of the real object 31-1 (eatery). For example, the navigation information may indicate a route from the current position of the user 20 to the position of the real object 31-1 (eatery). The navigation information may be displayed when an operation to reserve a menu (e.g., an operation to select a menu displayed on a reservation operation screen or a movement of shaking the head when a menu is displayed) is performed, or when the distance between the current position of the user 20 and the position of the real object 31-1 (eatery) is larger than the threshold.

In a case where the moving speed of the user 20 is decreasing while the distance between the virtual object 50-1 (recommended menu of the eatery) and the user 20 is reduced, the display controlling section 129 may cause the display unit 150 to display the virtual object 50-2 (details of the menu). It is to be noted that the display controlling section 129 may calculate the moving speed of the user 20 by any method. For example, the display controlling section 129 may calculate the moving speed of the user 20 on the basis of a time derivative of the position of the user 20.

For example, the amount of information of the virtual object 50-2 (details of the menu) may be larger than the amount of information of the virtual object 50-1 (recommended menu of the eatery). For example, the virtual object 50-1 (recommended menu of the eatery) includes texts indicating the name of a recommended menu, whereas the virtual object 50-2 (details of the menu) includes an image of the menu (e.g., an image of a hamburger) and the like. Accordingly, the amount of information of the virtual object 50-2 (details of the menu) is larger than the amount of information of the virtual object 50-1 (recommended menu of the eatery).

Figure 10:
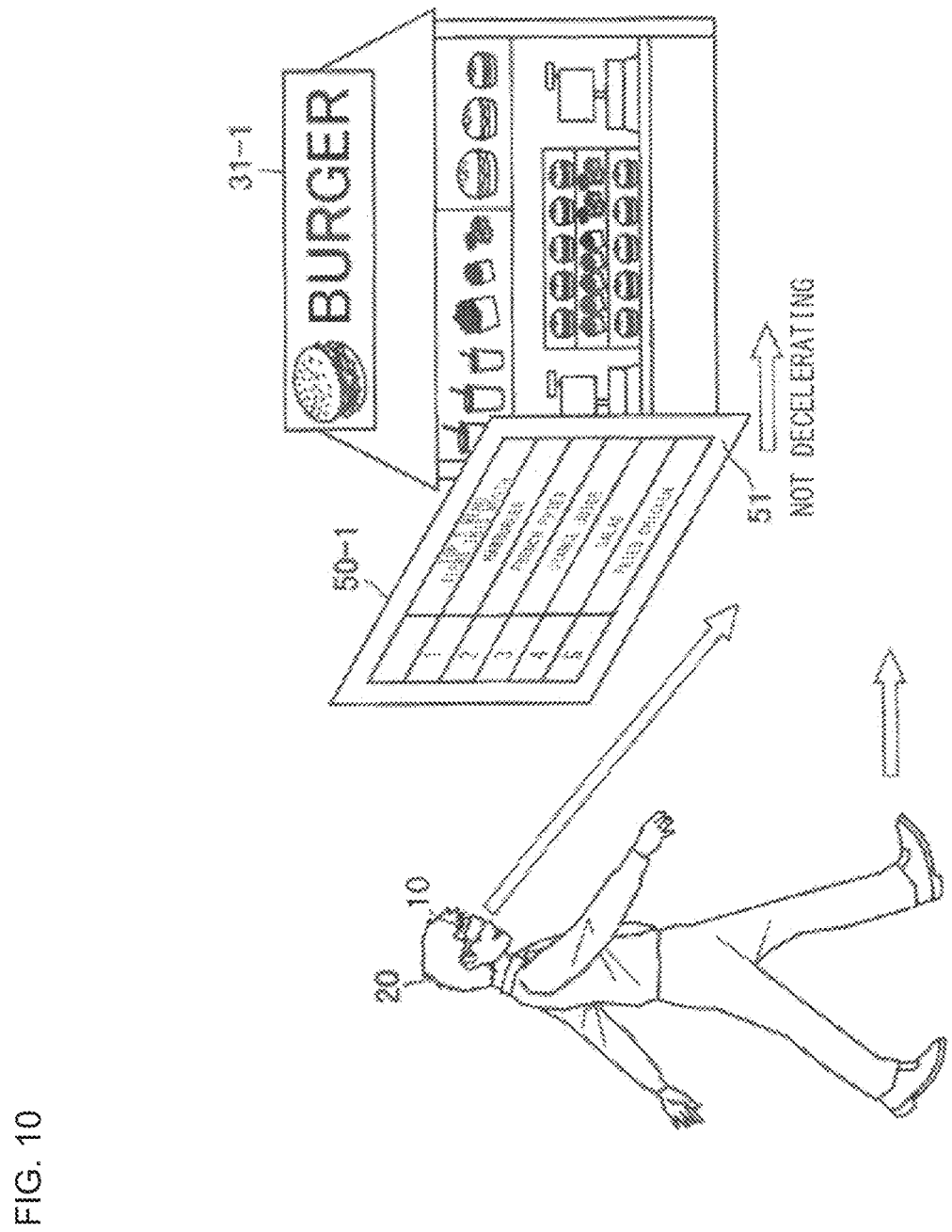
FIG. 10 is a diagram for describing the example control of the virtual object according to the first embodiment.
Figure 11:
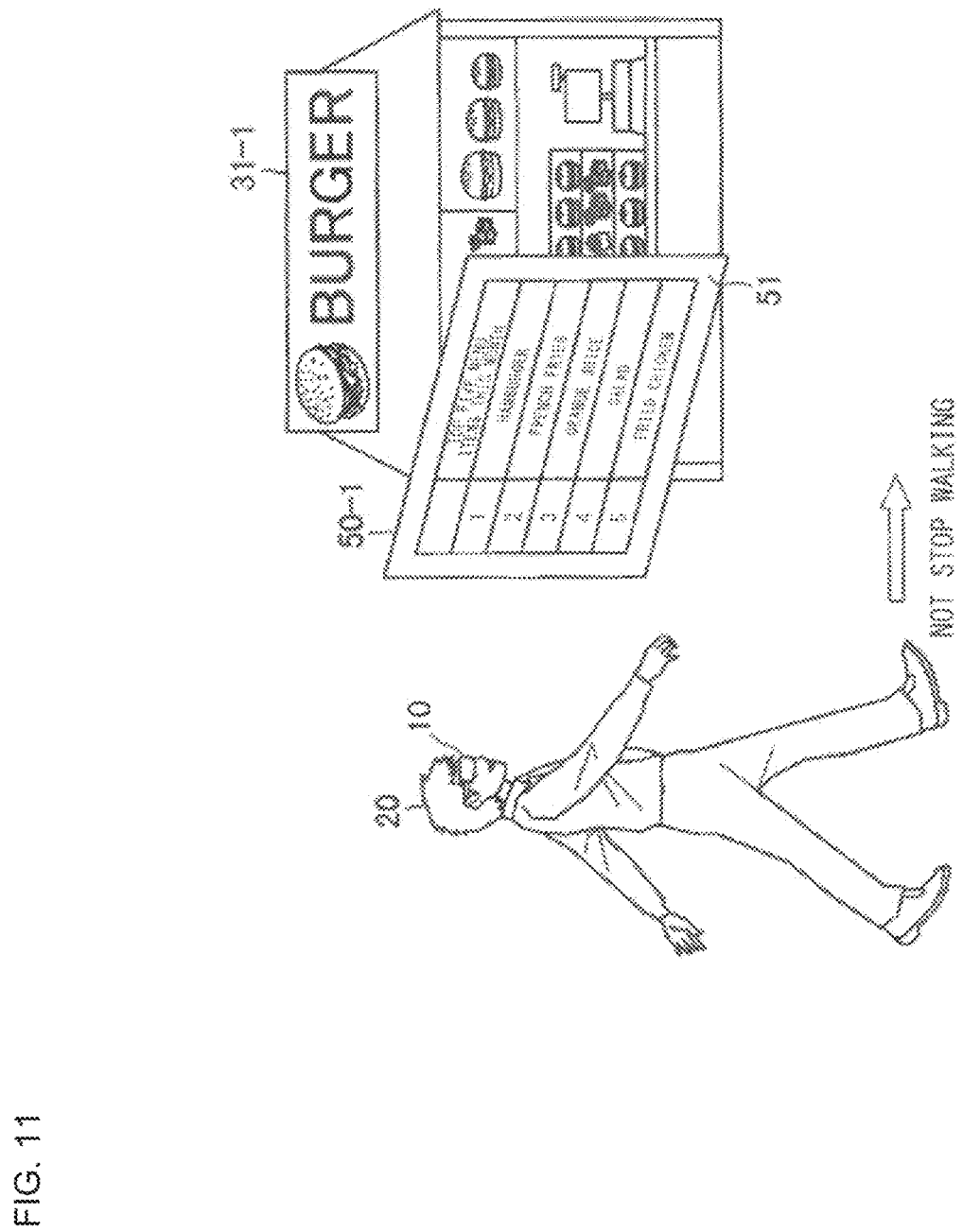
FIG. 11 is a diagram for describing the example control of the virtual object according to the first embodiment.

As illustrated in FIG. 10, in a case where the user 20 has no interest in the virtual object 50-1 (recommended menu of the eatery), the display controlling section 129 may refrain from reducing the distance (i.e., may continue to keep the distance) between the virtual object 50-1 (recommended menu of the eatery) and the user 20. Further, as illustrated in FIG. 11, in a case where the moving speed of the user 20 is not decreasing while the distance between the virtual object 50-1 (recommended menu of the eatery) and the user 20 is reduced, the display controlling section 129 may continue to cause the display unit 150 to display the virtual object 50-1 (recommended menu of the eatery) rather than the virtual object 50-2 (details of the menu).

Figure 12:
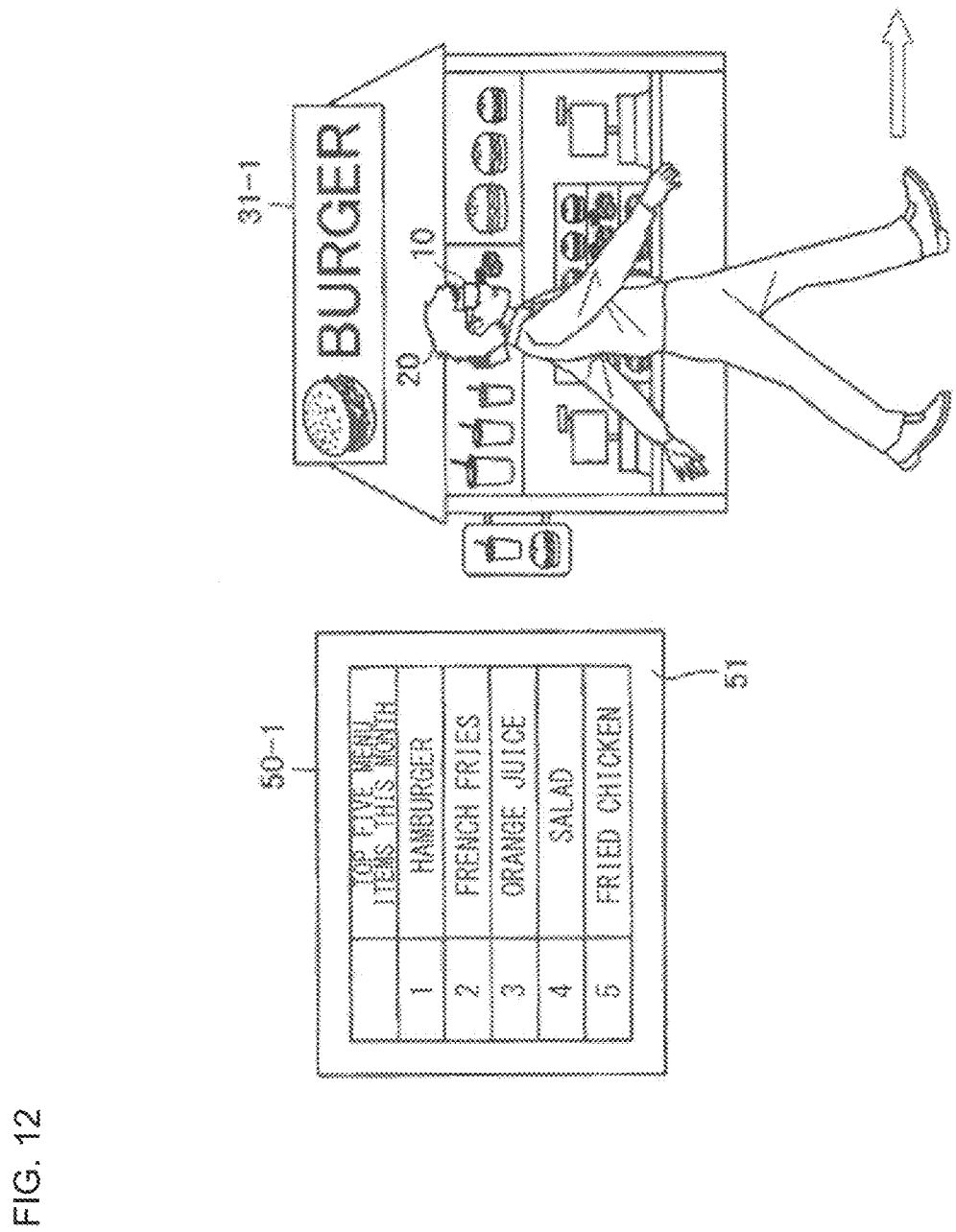
FIG. 12 a diagram for describing the example control of the virtual object according to the first embodiment.

As illustrated in FIG. 12, it is assumed that the user 20 having no interest in the virtual object 50-1 (recommended menu of the eatery) has come closer to the real object 31-1 (eatery) and where the predetermined condition is satisfied. More specifically, it is assumed that the distance between the user 20 and the real object 31-1 (eatery) becomes shorter than the second distance. In such a case, it is considered that the interest of the user 20 in the virtual object 50-1 (recommended menu of the eatery) has not been enhanced.

In such a case, the display controlling section 129 may then change the attitude of the virtual object 50-1 (recommended menu of the eatery) while moving the virtual object 50-1 (recommended menu of the eatery) remote from a moving direction of the user 20 (e.g., a route on which the user 20 is moving).

More specifically, in a case where the predetermined condition is satisfied (more specifically, in a case where the distance between user 20 and the real object 31-1 (eatery) becomes shorter than the second distance), the display controlling section 129 may change the attitude of the virtual object 50-1 (recommended menu of the eatery) such that an angle defined between the front face 51 of the virtual object 50-1 (recommended menu of the eatery) and the moving direction of the user 20 is small. FIG. 12 illustrates an example in which the display controlling section 129 changes the attitude of the virtual object 50-1 (recommended menu of the eatery) such that the front face 51 of the virtual object 50-1 (recommended menu of the eatery) and the moving direction of the user 20 are parallel to each other.

The functions of the information processing apparatus 10 according to the first embodiment of the present disclosure have been described in detail above.

2.2. Operation of Information Processing Apparatus

Figure 13:
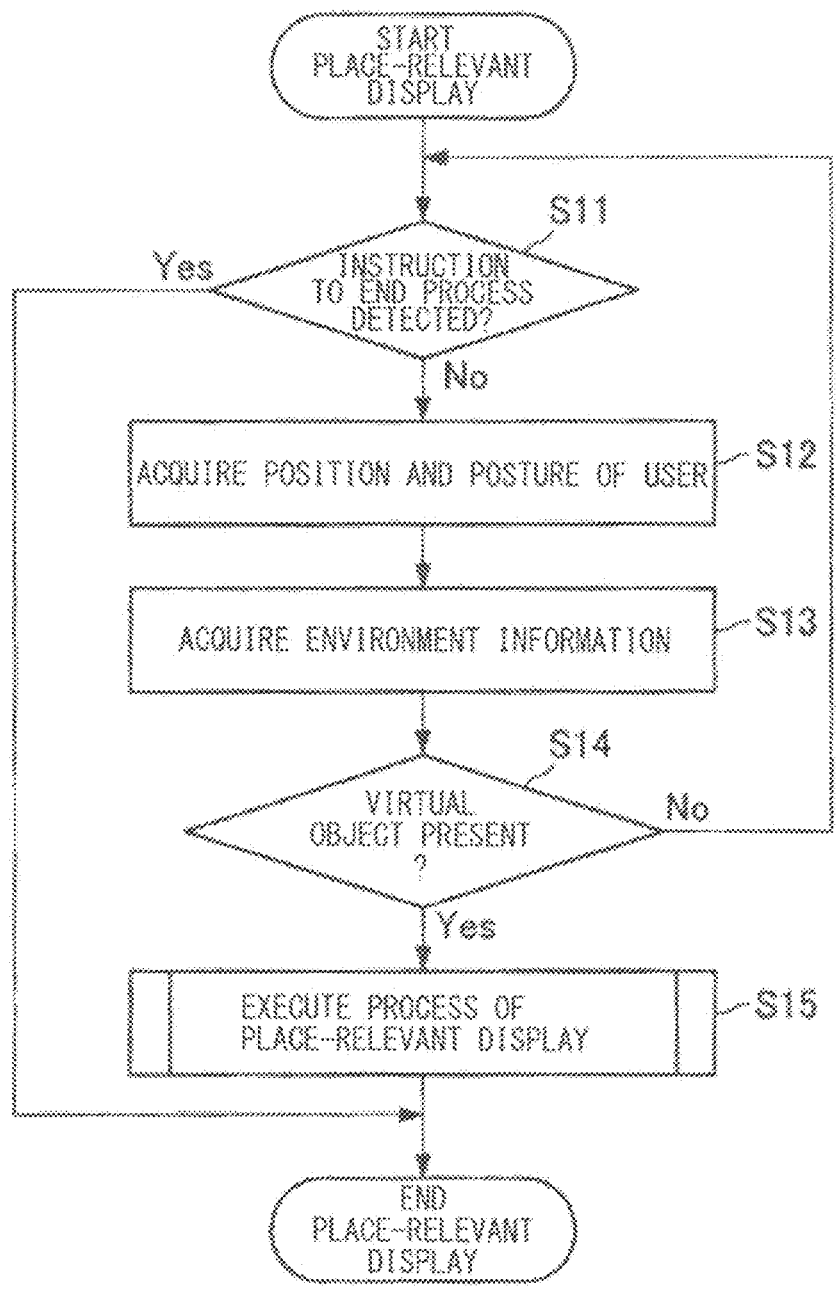
FIG. 13 is a flowchart illustrating an example operation of the information processing apparatus according to the first embodiment.
Figure 14:
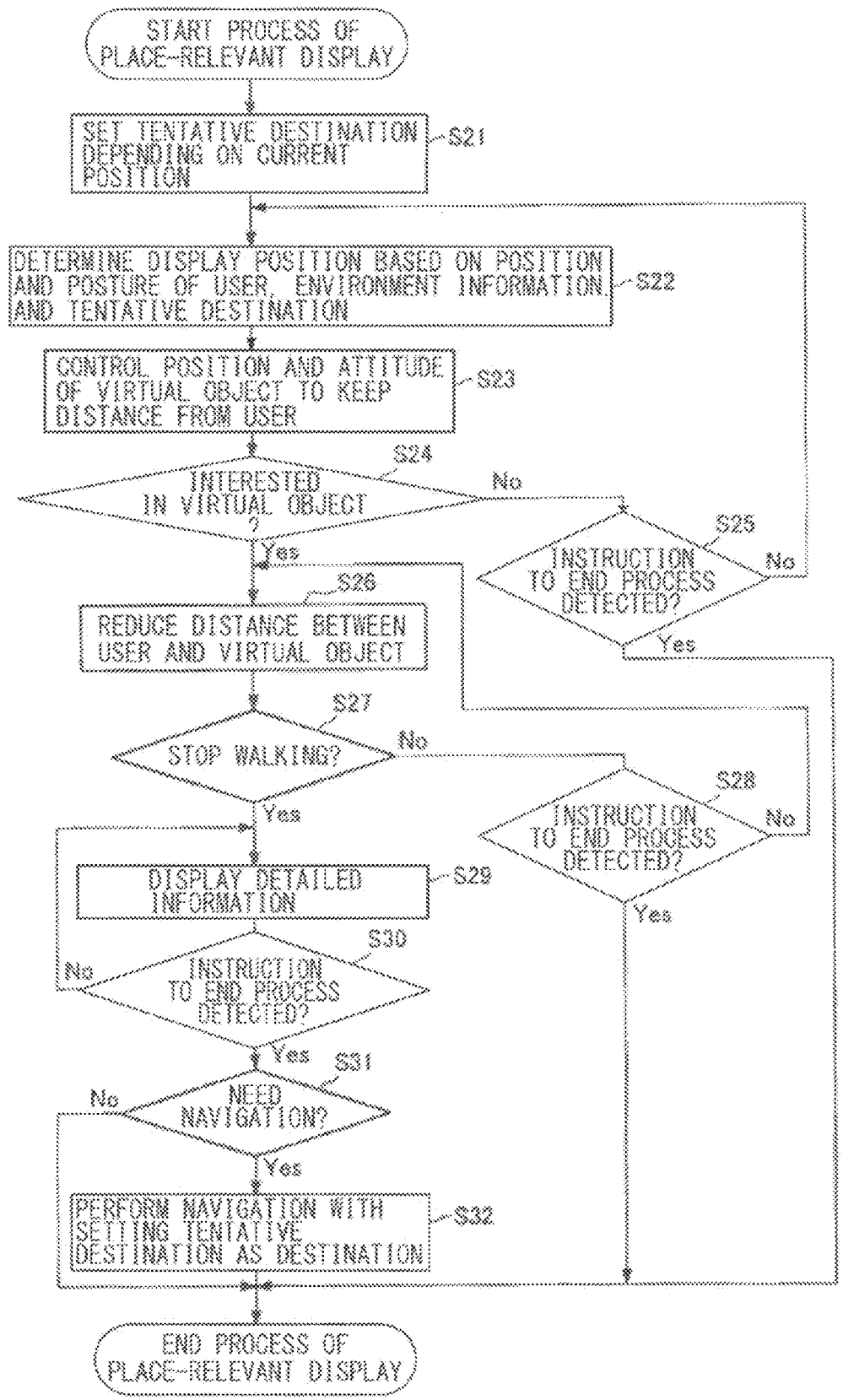
FIG. 14 is a flowchart illustrating an example operation of the information processing apparatus according to the first embodiment.

An example operation of the information processing apparatus 10 according to the first embodiment of the present disclosure is described with reference to FIGS. 13 and 14. FIGS. 13 and 14 are flowcharts each illustrating the example operation of the information processing apparatus 10 according to the first embodiment of the present disclosure. It is to be noted that the flowcharts illustrated in FIGS. 13 and 14 describe mere examples of the operation of the information processing apparatus 10 according to the first embodiment of the present disclosure. Therefore, the operation of the information processing apparatus 10 according to the first embodiment of the present disclosure should not be limited to the examples illustrated in FIGS. 13 and 14.

As illustrated in FIG. 13, in the first embodiment of the present disclosure, information (a virtual object) in connection with a predetermined position in the real space is started to be displayed (place-relevant display is started). When an instruction to end the process is detected ("Yes" in S11), the control unit 120 ends the place-relevant display. In contrast, when the instruction to end the process is not detected ("No" in S11), the environment information acquiring section 123 acquires the position and posture of the user detected by the sensor unit 110 (S12). It is to be noted that the instruction to end the process may be detected by detecting the line of sight of the user deviating from the virtual object.

On the basis of the position and posture of the user and the map information 135 (FIG. 5), the environment information acquiring section 123 acquires the relative position relation between the user and the real object (e.g., the position of the real object in the field of view of the user) as the environment information (S13). On the basis of the environment information, the context acquiring section 121 acquires the movement of the position (current position) of the user to a position remote from the position of the real object by a predetermined distance.

In a case where there is no virtual object corresponding to the context, "the position (current position) of the user has been moved to the position remote from the position of the real object by the predetermined distance" ("No" in S14), the control unit 120 causes the procedure to transit to S11. In contrast, in a case where there is a virtual object corresponding to the context, "the position (current position) of the user has been moved to the position remote from the position of the real object by the predetermined distance" ("Yes" in S14), the display controlling section 129 executes the process of the place-relevant display (S15).

The display controlling section 129 sets a tentative destination (the position of the real object) depending on the position (current position) of the user (S21). Thereafter, the display controlling section 129 determines a position at which the virtual object is to be displayed on the basis of the position and posture of the user, the environment information, and the tentative destination (S22). The display controlling section 129 causes the display unit 150 to display the virtual object at the determined display position. At this time, the display controlling section 129 may control the position and attitude of the virtual object such that the distance from the user is kept (S23).

In a case where the interest determining section 122 has not determined that the user has an interest in the virtual object ("No" in S24), the display controlling section 129 causes the procedure to transit to S25. When the instruction to end the process is not detected ("No" in S25), the control unit 120 causes the procedure to transit to S22. In contrast, when the instruction to end the process is detected ("Yes" in S25), the control unit 120 ends the place-relevant display.

On the other hand, in a case where the interest determining section 122 has determined that the user has an interest in the virtual object ("Yes" in S24), the display controlling section 129 reduces the distance between the user and the virtual object (S26). In a case where the user has not stopped walking ("No" in S27), the display controlling section 129 causes the procedure to transit to S28. It is to be noted that the wording "in a case where the user has not stopped walking" may be replaced with the wording "in a case where the user is not decelerating". When the instruction to end the process is not detected ("No" in S28), the control unit 120 causes the procedure to transit to S26. In contrast, when the instruction to end the process is detected ("Yes" in S28), the control unit 120 ends the place-relevant display.

On the other hand, in a case where the user has stopped walking ("Yes" in S27), the display controlling section 129 causes the display unit 150 to display the detailed information (S29). The wording "in a case where the user has stopped walking" may be replaced with the wording "in a case where the user is decelerating". When the instruction to end the process is not detected ("No" in S30), the control unit 120 causes the procedure to transit to S29. In contrast, when the instruction to end the process is detected ("Yes" in S30), the control unit 120 determines whether navigation is needed (S31). In a case where the navigation is not needed ("No" in S31), the control unit 120 ends the place-relevant display. In contrast, in a case where the navigation is needed ("Yes" in S31), the control unit 120 performs the navigation with setting the tentative destination as a destination (S32), and ends the place-relevant display.

The example operation of the information processing apparatus 10 according to the first embodiment of the present disclosure has been described above.

2.3. Various Modification Examples

The functions of the information processing apparatus 10 according to the first embodiment of the present disclosure are implemented as described above. However, the functions of the information processing apparatus 10 according to the first embodiment of the present disclosure should not be limited to the examples described above. For example, although the virtual object (recommended menu of the eatery) is displayed as the first virtual object in the above description, the first virtual object may be an agent showing the recommended menu of the eatery. In this case, the agent may direct its line of sight to the user 20.

Additionally, in the example described above, the distance between the virtual object 50-1 (recommended menu of the eatery) and the user 20 is reduced on the basis of the determination that the user 20 has an interest in the virtual object 50-1 (recommended menu of the eatery). To enhance the interest of the user 20 in the virtual object 50-1 (recommended menu of the eatery), the display controlling section 129 may cause the agent to speak to the user 20 while reducing the distance between the virtual object 50-1 (recommended menu of the eatery) and the user 20.

Further, in the example described above, whether the user 20 has an interest in the virtual object 50-1 (recommended menu of the eatery) is determined on the basis of the line of sight of the user 20. However, whether the user 20 has an interest in the virtual object 50-1 (recommended menu of the eatery) may be determined on the basis of a dialog between the user 20 and the agent. Additionally, in the example described above, the virtual object 50-2 (details of the menu) is displayed as the second virtual object. However the second virtual object may be a "menu recommended by the agent".

In the example described above, the shop is present in the predetermined position in the real space. However, a relaxation space of a commercial facility may be present at the predetermined position in the real space. Additionally, information relevant to the predetermined position may include information on the relaxation space of the commercial facility present at the predetermined position (e.g., menus available in the relaxation space). In such a case, an operation to purchase the menu may be performed in place of the operation to reserve the menu, and a purchase operation screen may be displayed in place of the reservation operation screen.

3. Detailed Description of Second Embodiment

Next, a second embodiment of the present disclosure is described in detail.

In the second embodiment of the present disclosure, the first virtual object may indicate information irrelevant to a predetermined position in the real space. In the second embodiment of the present disclosure, when the information processing apparatus 10 receives information (e.g., e-mail, etc.), the first virtual object containing a notification object that notifies the user of the reception of the information by the information processing apparatus 10 is displayed.

3.1. Detailed Description of Function of Information Processing Apparatus

Functions of the information processing apparatus 10 according to the second embodiment of the present disclosure will now be described in detail. Hereinafter, the functions of the information processing apparatus 10 according to the second embodiment of the present disclosure are described in detail with reference to FIGS. 15 to 21 (and FIGS. 1 to 5 as appropriate).

Figure 15:
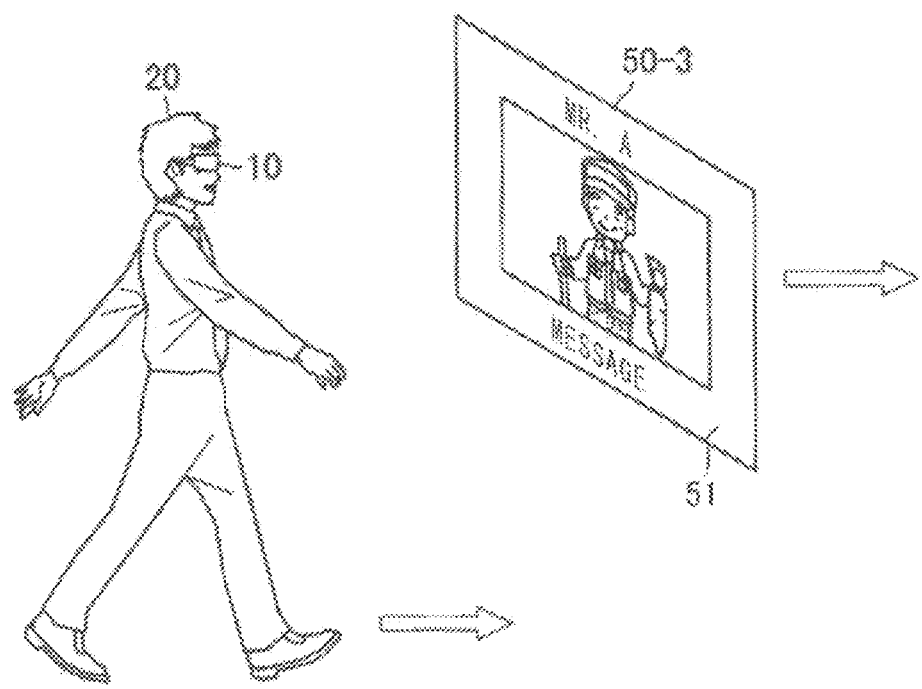
FIG. 15 is a diagram for describing control example of a virtual object according to a second embodiment of the present disclosure.

FIGS. 15 to 21 are diagrams each illustrating example control of the virtual object according to the second embodiment of the present disclosure. With reference to FIG. 15, the information processing apparatus 10 forms a field of view of the user 20. The user 20 is moving in a desired direction. Also in the second embodiment, it is assumed that the user is moving on foot. However, the movement of the user should not be limited to walking. For example, the user may move using a vehicle (e.g., bicycle, car, etc.).

Additionally, information in which the type of a real object is connected with position information of the real object is stored as the map information 135 (FIG. 5). The environment information acquiring section 123 acquires environment information. More specifically, when the sensor unit 110 detects the position and posture of the user 20, the environment information acquiring section 123 may acquire, as the environment information, a relative position relation between the user 20 and the real object on the basis of the position and posture of the user 20 and the map information 135 (FIG. 5). For example, the relative position relation is the position of the real object in the field of view of the user 20.

The relative position relation between the user 20 and the real object may be acquired by any method. For example, the relative position relation between the user 20 and the real object may be recognized directly from a captured image of the field of view of the user 20. Further, the environment information should not be limited to the relative position relation between the user 20 and the real object. For example, the environment information may be an environmental sound detected in the environment surrounding the user 20 by a microphone, or may be illuminance detected by an illuminance sensor.

When the communication unit 140 receives notification information (e.g., e-mail, etc.), the context acquiring section 121 acquires the notification information received by the communication unit 140. When the context acquiring section 121 acquires the notification information, the display controlling section 129 acquires a virtual object 50-3 (message from Mr. A) as a notification object that notifies the user of the reception of the notification information by the communication unit 140. The display controlling section 129 causes the display unit 150 to display the acquired virtual object 50-3 (message from Mr. A) in the field of view.

It is to be noted that, in an example illustrated in FIG. 15, the virtual object 50-3 (message from Mr. A) contains the name of a sender "Mr. A", an image of the sender, and a title "message". However, the virtual object 50-3 (message from Mr. A) may contain any information.

In this embodiment, the position of the virtual object 50-3 (message from Mr. A) in the field of view should not be limited. For example, the display controlling section 129 causes the display unit 150 to display the virtual object 50-3 (message from Mr. A) substantially in front of the user. That is, the virtual object 50-3 (message from Mr. A) may be displayed straight in front of the user 20 or may be displayed at a position laterally in front of the user 20 (left-front of the user 20 in the example illustrated in FIG. 15) so as not to hinder the user 20 from walking. For example, the position laterally in front of the user 20 may be present within a peripheral field of view.

The attitude of the virtual object 50-3 (message from Mr. A) should also not be limited. For example, the display controlling section 129 may keep the attitude of the virtual object 50-3 (message from Mr. A) such that a surface of the virtual object 50-3 (message from Mr. A) on which the information is provided (i.e., a front face 51 of the virtual object 50-3 (message from Mr. A)) is substantially perpendicular to a direction from the user 20 to the virtual object 50-3 (message from Mr. A), in order to allow the user 20 to easily visually recognize the virtual object 50-3 (message from Mr. A).

It is to be noted that, in the example illustrated in FIG. 15, the number of the virtual objects (first virtual objects) displayed in the field of view of the user 20 is one. However, the number of the virtual objects (first virtual objects) displayed in the field of view of the user 20 should not be limited to one. For example, the number of the virtual objects (first virtual objects) displayed in the field of view of the user 20 may be two or more.

For example, to cause the display unit 150 to display two or more virtual objects (first virtual objects), the display controlling section 129 may control the timing or the position (or attitude) at which the two or more virtual objects (first virtual objects) are displayed such that the two or more virtual objects (first virtual objects) are not visually recognized by the user 20 as being overlapped with one another. For example, the display controlling section 129 may cause the two or more virtual objects (first virtual objects) to be displayed at different timings, or may change the position (or attitude) of at least one of the two or more virtual objects (first virtual objects). This facilitates separate control of the respective virtual objects (first virtual objects).

Figure 16:
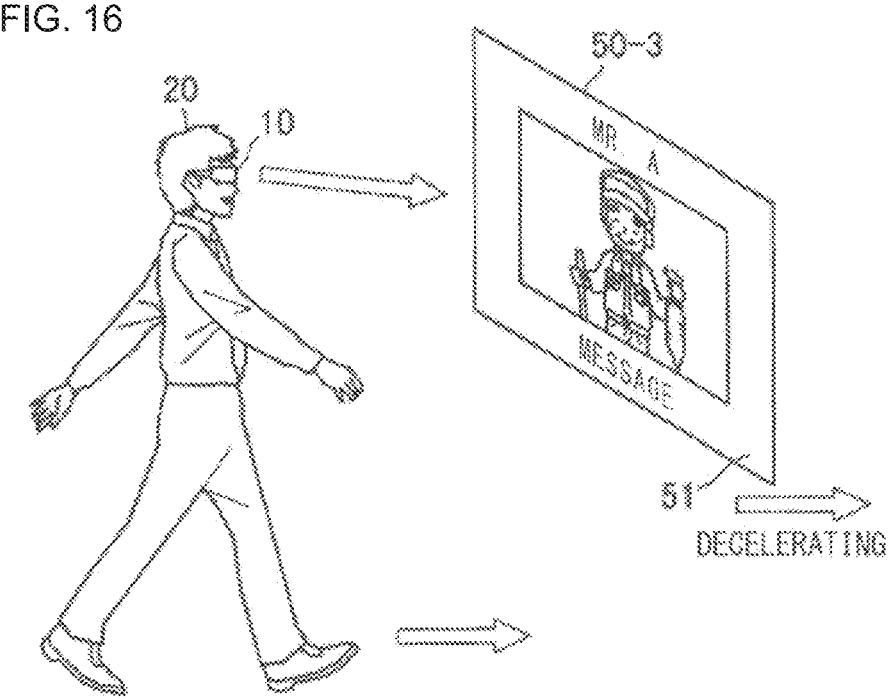
FIG. 16 is a diagram for describing the control example of the virtual object according to the second embodiment.

As the user 20 keeps walking, the position of the user 20 moves from the position in the example illustrated in FIG. 15 to the position in the example illustrated in FIG. 16. At this time, the display controlling section 129 performs the distance keeping control that substantially keeps the distance between the user 20 and the virtual object 50-3 (message from Mr. A). Thus, the distance between the user 20 and the virtual object 50-3 (message from Mr. A) is not substantially changed.

It is to be noted that the display controlling section 129 may set the same distance between the user 20 and the virtual object 50-3 (message from Mr. A) regardless of the moving speed of the user 20. However, the user 20 is likely to visually recognize a farther position as the moving speed increases. Accordingly, the display controlling section 129 may perform the distance keeping control such that the distance between the user 20 and the virtual object 50-3 (message from Mr. A) becomes larger as the moving speed of the user 20 increases.

When a predetermined condition is satisfied, the display controlling section 129 ends the distance keeping control that substantially keeps the distance between the user 20 and the virtual object 50-1 (recommended menu of the eatery). Thereafter, the display controlling section 129 changes the distance between the user 20 and the virtual object 50-3 (message from Mr. A). The predetermined condition may include a condition that the virtual object 50-3 (message from Mr. A) has been displayed for a predetermined period of time.

Hereinafter, it is assumed that the distance between the user 20 and the virtual object 50-3 (message from Mr. A) is reduced when the virtual object 50-3 (message from Mr. A) has been displayed for a first period of time. Additionally, hereinafter, it is assumed that the distance between the user 20 and the virtual object 50-3 (message from Mr. A) is increased when the virtual object 50-3 (message from Mr. A) has been displayed for a second period of time that is longer than the first period of time.

When the virtual object 50-3 (message from Mr. A) has been displayed for the first period of time, the interest determining section 122 determines whether the user 20 has an interest in the virtual object 50-3 (message from Mr. A). Whether the user 20 has an interest in the virtual object 50-3 (message from Mr. A) may be determined by any method. For example, the interest determining section 122 may determine whether the user 20 has an interest in the virtual object 50-3 (message from Mr. A) on the basis of whether the line of sight of the user 20 has moved toward the virtual object 50-3 (message from Mr. A).

The display controlling section 129 reduces the distance between the virtual object 50-3 (message from Mr. A) and the user 20 on the basis of the determination that the user 20 has an interest in the virtual object 50-3 (message from Mr. A). In the example illustrated in FIG. 16, the interest determining section 122 determines that the user 20 has an interest in the virtual object 50-3 (message from Mr. A) because the user 20 has moved his/her line of sight toward the virtual object 50-3 (message from Mr. A).

In such a case, as illustrated in FIG. 16, the display controlling section 129 may reduce the distance between the virtual object 50-3 (message from Mr. A) and the user 20. That is, the display controlling section 129 may decelerate the virtual object 50-3 (message from Mr. A).

It is to be noted that the display controlling section 129 may unconditionally reduce the distance between the virtual object 50-3 (message from Mr. A) and the user 20 in a case where the user 20 has an interest in the virtual object 50-3 (message from Mr. A). Alternatively, the display controlling section 129 may reduce the distance between the virtual object 50-3 (message from Mr. A) and the user 20 in a case where the user 20 has an interest in the virtual object 50-3 (message from Mr. A) and where a condition that the user 20 is sufficiently able to keep walking.

For example, the display controlling section 129 may estimate a time or distance in which the user 20 is able to keep walking on the basis of the environment information (the relative position relation between the user 20 and the real object). For example, the display controlling section 129 may specify an area in which the user 20 is allowed to walk by excluding an area in which the user 20 is not allowed to walk (e.g., rivers, express ways, etc.) from the real space on the basis of the environment information, and may estimate the time or distance in which the user 20 is able to keep walking on the basis of the area in which the user is allowed to walk. Thereafter, the display controlling section 129 may reduce the distance between the virtual object 50-3 (message from Mr. A) and the user 20 in a case where the time or distance in which the user 20 is able to keep walking becomes greater than a threshold.

In the example illustrated in FIG. 16, the display controlling section 129 maintains a constant amount of information of the virtual object 50-3 (message from Mr. A) while reducing the distance between the virtual object 50-3 (message from Mr. A) and the user 20. However, the display controlling section 129 may increase the amount of information of the virtual object 50-3 (message from Mr. A) while reducing the distance between the virtual object 50-3 (message from Mr. A) and the user 20, in order to enhance the interest of the user 20 in the virtual object 50-3 (message from Mr. A).

It is preferred that the display controlling section 129 changes the attitude of the virtual object 50-3 (message from Mr. A) such that the attitude of the virtual object 50-3 (message from Mr. A) relative to the user 20 is maintained while reducing the distance between the user 20 and the virtual object 50-3 (message from Mr. A). Maintaining the attitude of the virtual object 50-3 (message from Mr. A) relative to the user 20 allows the user 20 to easily visually recognize the virtual object 50-3 (message from Mr. A).

Figure 17:
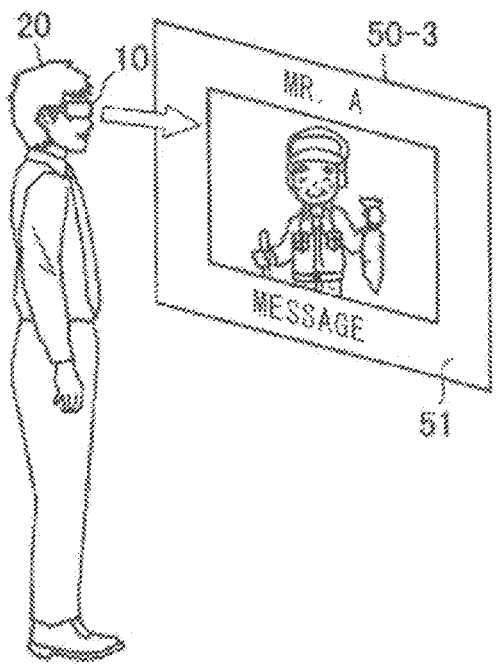
FIG. 17 is a diagram for describing the control example of the virtual object according to the second embodiment.

For example, as illustrated in FIG. 17, the display controlling section 129 may keep the attitude of the virtual object 50-3 (message from Mr. A) such that the front face 51 of the virtual object 50-3 (message from Mr. A) is substantially perpendicular to the direction from the user 20 to the virtual object 50-3 (message from Mr. A) while reducing the distance between the virtual object 50-3 (message from Mr. A) and the user 20.

In an example illustrated in FIG. 17, the distance between the virtual object 50-3 (message from Mr. A) and the user 20 is shorter than that in the example illustrated in FIG. 16. Further, in the example illustrated in FIG. 17, the attitude of the virtual object 50-3 (message from Mr. A) is changed from that in the example illustrated in FIG. 16 while the attitude of the virtual object 50-3 (message from Mr. A) relative to the user is maintained.

If the user 20 has a strong interest in the virtual object 50-3 (message from Mr. A), the moving speed of the user 20 is considered to decrease while the distance between the virtual object 50-3 (message from Mr. A) and the user 20 is reduced. In a case where the user has a strong interest in the virtual object 50-3 (message from Mr. A), the display controlling section 129 may cause the display unit 150 to display a virtual object (second virtual object) relevant to the virtual object 50-3 (message from Mr. A).

Figure 18:
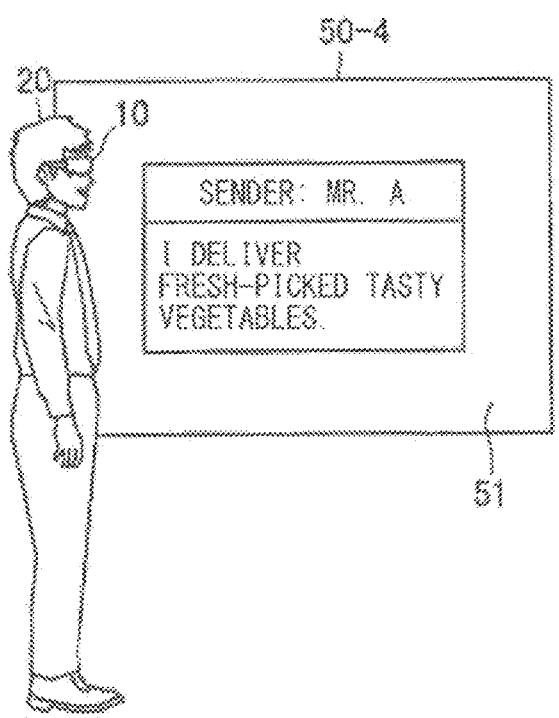
FIG. 18 is a diagram for describing the control example of the virtual object according to the second embodiment.

In an example illustrated in FIG. 18, a virtual object 50-4 (the main body of the message from Mr. A) is displayed as an example of the virtual object (second virtual object). That is, the display controlling section 129 may cause the display unit 150 to display the virtual object 50-4 (the main body of the message from Mr. A) in a case where the moving speed of the user 20 decreases while the distance between the virtual object 50-3 (message from Mr. A) and the user 20 decreases. For example, the amount of information on the virtual object 50-4 (the main body of the message from Mr. A) may be greater than the amount of information on the virtual object 50-3 (message from Mr. A).

Figure 19:
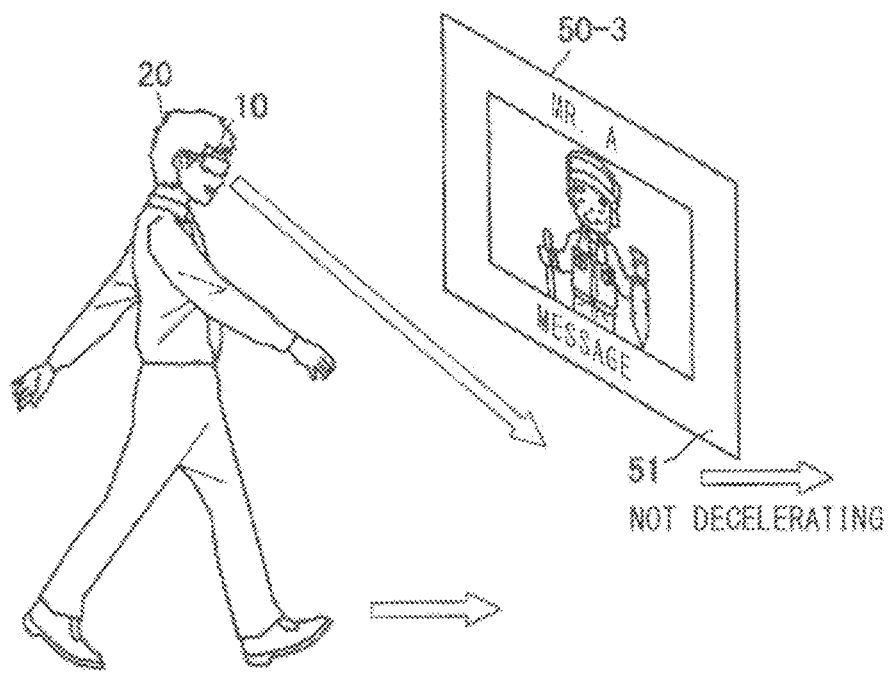
FIG. 19 is a diagram for describing the control the example of the virtual object according to the second embodiment.
Figure 20:
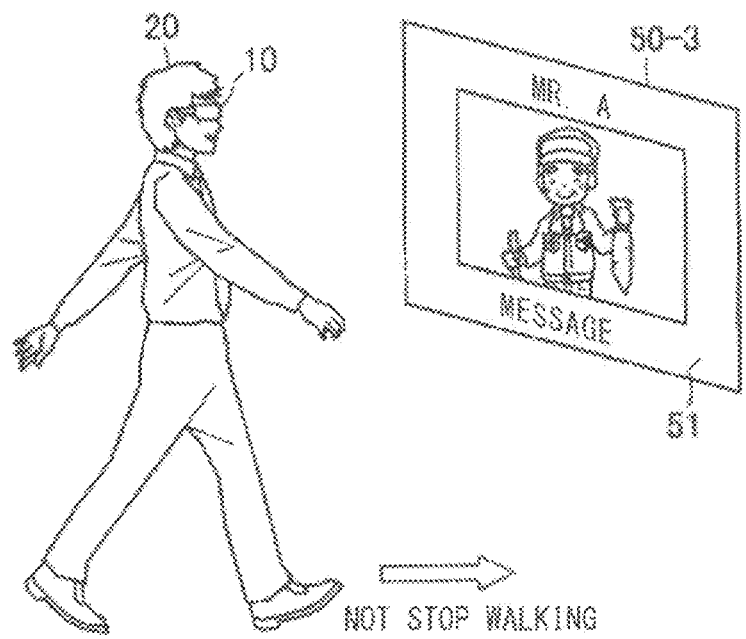
FIG. 20 is a diagram for describing the control example of the virtual object according to the second embodiment.

As illustrated in FIG. 19, in a case where the user 20 has no interest in the virtual object 50-3 (message from Mr. A), the display controlling section 129 may refrain from reducing the distance (i.e., may continue to keep the distance) between the virtual object 50-3 (message from Mr. A) and the user 20. Further, as illustrated in FIG. 20, in a case where the moving speed of the user 20 is not decreasing while the distance between the virtual object 50-3 (message from Mr. A) and the user 20 is reduced, the display controlling section 129 may continue to cause the display unit 150 to display virtual object 50-3 (message from Mr. A) rather than the virtual object 50-4 (the main body of the message from Mr. A).

Figure 21:
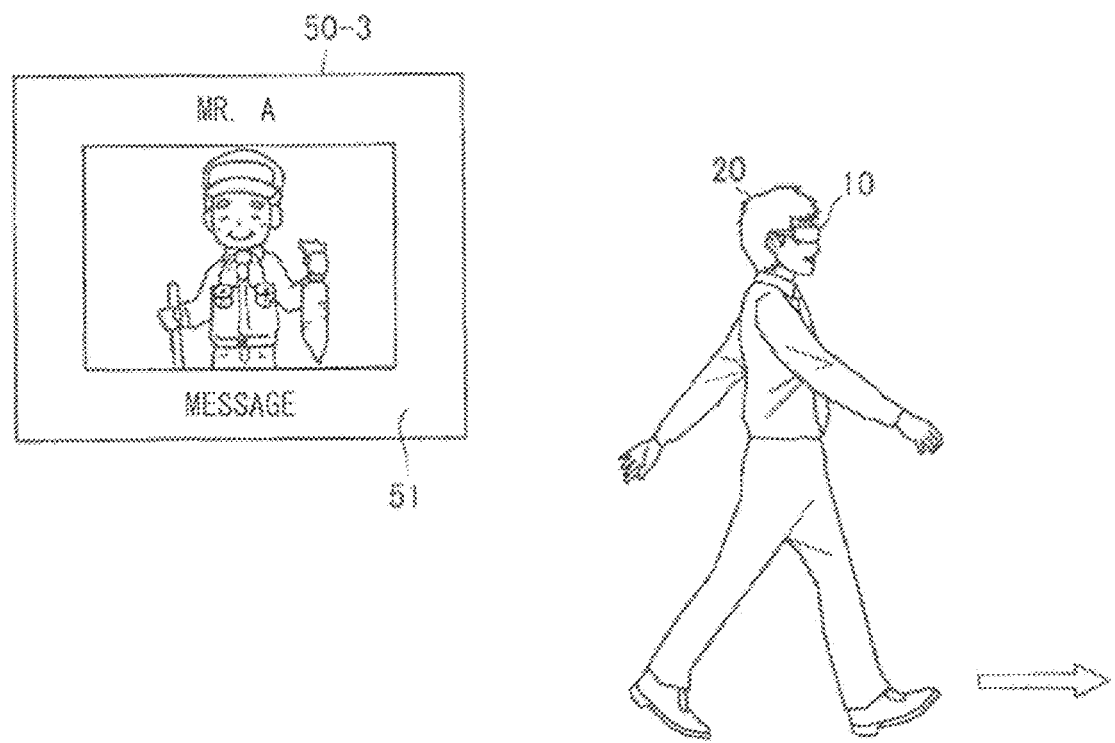
FIG. 21 is a diagram for describing the control example of the virtual object according to the second embodiment.

As illustrated in FIG. 21, it is assumed that the predetermined condition is satisfied before the user 20 has an interest in the virtual object 50-3 (message from Mr. A). More specifically, it is assumed that the virtual object 50-3 (message from Mr. A) has been displayed for the second period of time. In such a case, it is considered that the interest of the user 20 in the virtual object 50-3 (message from Mr. A) has not been enhanced.

In such a case, the display controlling section 129 may then change the attitude of the virtual object 50-3 (message from Mr. A) while moving the virtual object 50-3 (message from Mr. A) remote from a moving direction of the user 20 (e.g., a route on which the user 20 is moving).

More specifically, in a case where the predetermined condition is satisfied (more specifically, in a case where the virtual object 50-3 (message from Mr. A) has been displayed for the second period of time), the display controlling section 129 may change the attitude of the virtual object 50-3 (message from Mr. A) such that an angle defined between the front face 51 of the virtual object 50-3 (message from Mr. A) and the moving direction of the user 20 is small. FIG. 21 illustrates an example in which the display controlling section 129 changes the attitude of the virtual object 50-3 (message from Mr. A) such that the front face 51 of the virtual object 50-3 (message from Mr. A) and the moving direction of the user 20 are parallel to each other.

The functions of the information processing apparatus 10 according to the second embodiment of the present disclosure have been described in detail above.

3.2. Operation of Information Processing Apparatus

Figure 22:
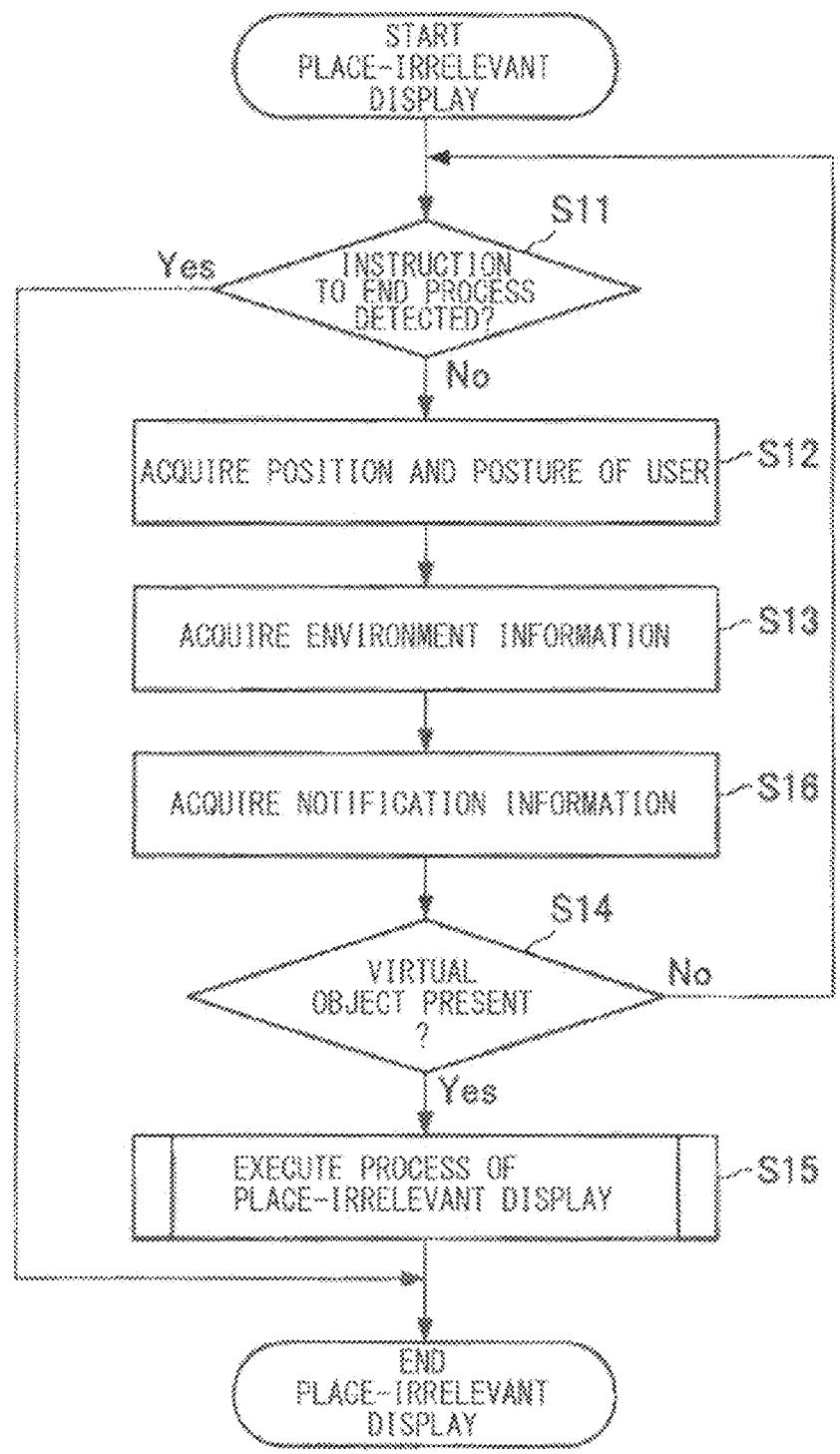
FIG. 22 is a flowchart illustrating an example operation of an information processing apparatus according to the second embodiment of the present disclosure.
Figure 23:
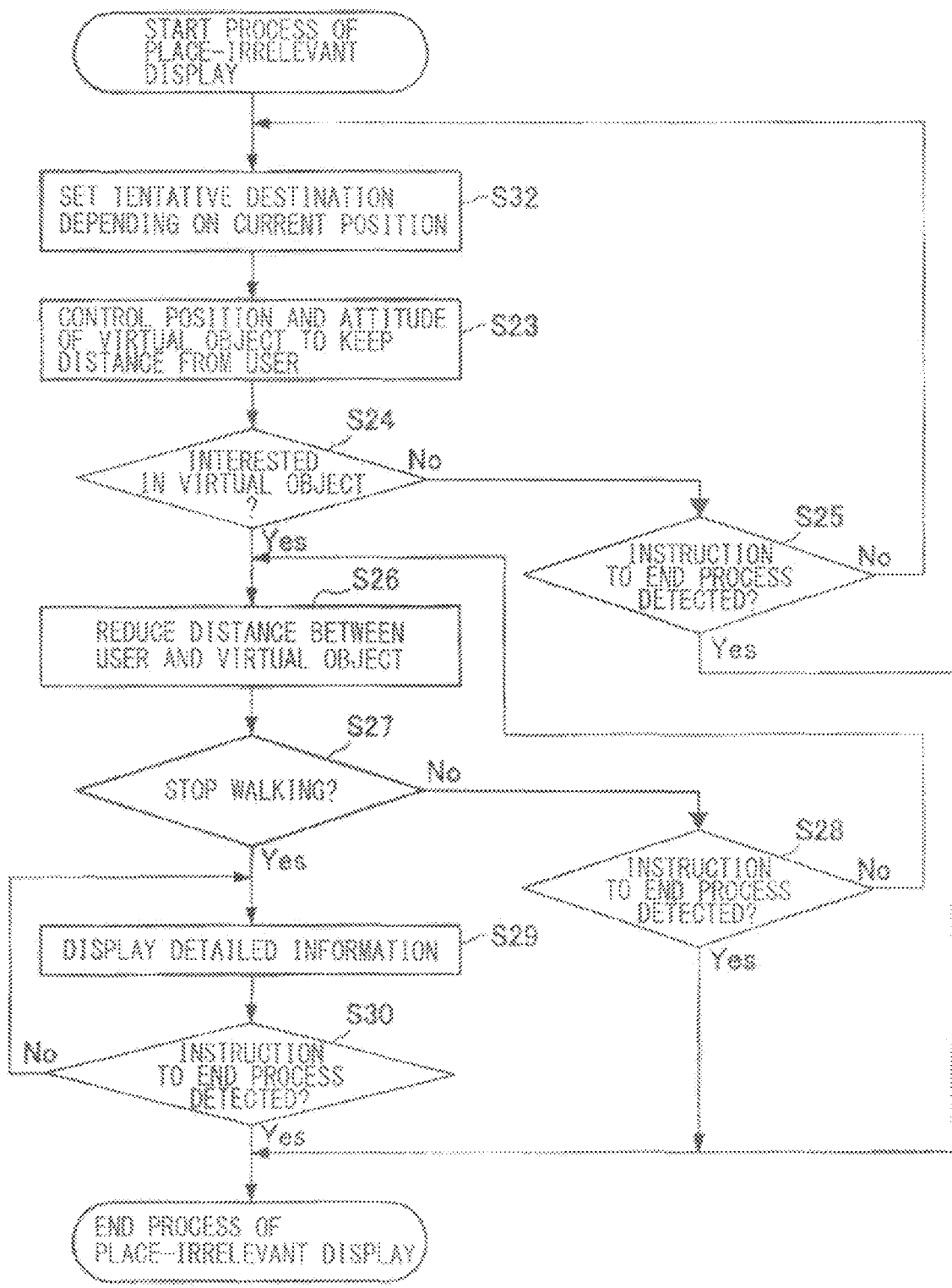
FIG. 23 is a flowchart illustrating an example operation of the information processing apparatus according to the second embodiment.

An example operation of the information processing apparatus 10 according to the second embodiment of the present disclosure is described with reference to FIGS. 22 and 23. FIGS. 22 and 23 are flowcharts each illustrating the example operation of the information processing apparatus 10 according to the second embodiment of the present disclosure. It is to be noted that the flowcharts illustrated in FIGS. 22 and 23 describe mere examples of the operation of the information processing apparatus 10 according to the second embodiment of the present disclosure. Therefore, the operation of the information processing apparatus 10 according to the second embodiment of the present disclosure should not be limited to the examples illustrated in FIGS. 22 and 23.

As illustrated in FIG. 22, in the second embodiment of the present disclosure, information (a virtual object) not in connection with a predetermined position in the real space is started to be displayed (place-irrelevant display is started). When an instruction to end the process is detected ("Yes" in S11), the control unit 120 ends the place-irrelevant display. In contrast, when the instruction to end the process is not detected ("No" in S11), the environment information acquiring section 123 acquires the position and posture of the user detected by the sensor unit 110 (S12). It is to be noted that the instruction to end the process may be detected by detecting the line of sight of the user deviating from the virtual object.

On the basis of the position and posture of the user and the map information 135 (FIG. 5), the environment information acquiring section 123 acquires the relative position relation between the user and the real object (e.g., the position of the real object in the field of view of the user) as the environment information (S13). When the communication unit 140 receives notification information (e.g., e-mail, etc.), the context acquiring section 121 acquires the notification information received by the communication unit 140 (S16). When the context acquiring section 121 acquires the notification information, the control unit 120 determines whether there is a virtual object serving as a notification object that notifies the user of the reception of the notification information by the communication unit 140.

In a case where there is no virtual object ("No" in S14), the control unit 120 causes the procedure to transit to S11. In contrast, in a case where there is the virtual object ("Yes" in S14), the display controlling section 129 executes the process of the place-irrelevant display (S15).

The display controlling section 129 determines a position at which the virtual object to be displayed on the basis of the position and posture of the user and the environment information. The display controlling section 129 causes the display unit 150 to display the virtual object at the determined display position. At this time, the display controlling section 129 may control the position and attitude of the virtual object such that the distance from the user is kept (S23).

In a case where the interest determining section 122 has not determined that the user has an interest in the virtual object ("No" in S24), the display controlling section 129 causes the procedure to transit to S25. When the instruction to end the process is not detected ("No" in S25), the control unit 120 causes the procedure to transit to S32. In contrast, when the instruction to end the process is detected ("Yes" in S25), the control unit 120 ends the place-irrelevant display.

On the other hand, in a case where the interest determining section 122 has determined that the user has an interest in the virtual object ("Yes" in S24), the display controlling section 129 reduces the distance between the user and the virtual object (S26). In a case where the user has not stopped walking ("No" in S27), the display controlling section 129 causes the procedure to transit to S28. It is to be noted that the wording "in a case where the user has not stopped walking" may be replaced with the wording "in a case where the user is not decelerating". When the instruction to end the process is not detected ("No" in S28), the control unit 120 causes the procedure to transit to S26. In contrast, when the instruction to end the process is detected ("Yes" in S28), the control unit 120 ends the place-irrelevant display.

On the other hand, in a case where the user has stopped walking ("Yes" in S27), the display controlling section 129 causes the display unit 150 to display the detailed information (S29). The wording "in a case where the user has stopped walking" may be replaced with the wording "in a case where the user is decelerating". When the instruction to end the process is not detected ("No" in S30), the control unit 120 causes the procedure to transit to S29. In contrast, when the instruction to end the process is detected ("Yes" in S30), the control unit 120 ends the place-irrelevant display.

The example operation of the information processing apparatus 10 according to the second embodiment of the present disclosure has been described above.

3.3. Various Modification Examples

The functions of the information processing apparatus 10 according to the first embodiment of the present disclosure are implemented as described above. However, the functions of the information processing apparatus 10 according to the first embodiment of the present disclosure should not be limited to the examples described above. For example, although the virtual object 50-3 (message from Mr. A) is displayed as the first virtual object in the above description, the first virtual object may be a coupon available in the store. In this case, the second virtual object may be detailed information of the coupon.

4. Example Hardware Configuration

Figure 24:
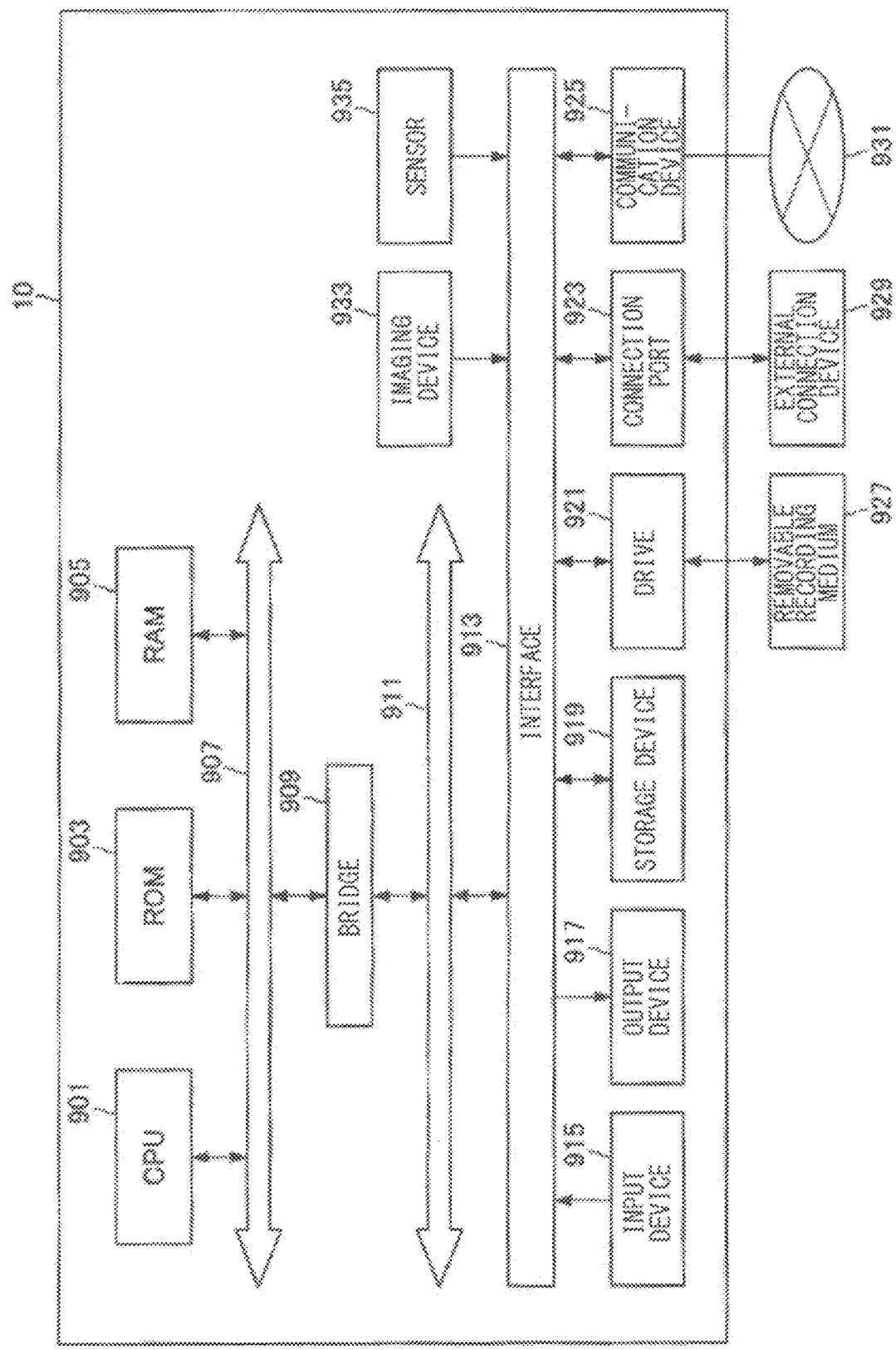
FIG. 24 is a block diagram illustrating an example hardware configuration of the information processing apparatus.

Next, an example hardware configuration of the information processing apparatus 10 according to an embodiment of the present disclosure is described with reference to FIG. 24. FIG. 24 is a block diagram illustrating the example hardware configuration of the information processing apparatus 10 according to the embodiment of the present disclosure.

As illustrated in FIG. 24, the information processing apparatus 10 includes a central processing unit (CPU) 901, a read only memory (ROM) 903, and a random access memory (RAM) 905. Additionally, the information processing apparatus 10 includes a host bus 907, a bridge 909, an external bus 911, an interface 913, an input device 915, an output device 917, a storage device 919, a drive 921, a connection port 923, and a communication device 925. The information processing apparatus further includes an imaging device 933 and a sensor 935. The information processing apparatus 10 may include a processing circuit, which is referred to as a digital signal processor (DSP) or an application specific integrated circuit (ASIC), in place of or in addition to the CPU 901.

The CPU 901 functions as a calculation processing device or a control device. The CPU 901 controls an entire or partial operation of the information processing apparatus 10 in accordance with various programs stored in the ROM 903, the RAM 905, the storage device 919, or a removable recording medium 927. The ROM 903 stores programs and calculation parameters to be used by the CPU 901. The RAM 905 temporarily stores programs to be used for execution of the CPU 901 or parameters to be appropriately changed during the execution. The CPU 901, the ROM 903, and the RAM 905 are mutually coupled via the host bus 907 including an internal bus such as a CPU bus. Further, the host bus 907 is coupled to the external bus 911, which may be a peripheral component interconnect/interface (PCI) bus, via the bridge 909.

The input device 915 is a device operated by the user. Examples of the input device 915 include a mouse, a keyboard, a touch panel, a button, a switch, a lever, and the like. The input device 915 may include a microphone that detects a voice of the user. For example, the input device 915 may be a remote control device using infrared light or other electric waves, or an external connection device 929, such as a mobile phone, that operates in accordance with the operation of the information processing apparatus 10. The input device 915 includes an input control circuit that generates an input signal based on information inputted by the user and outputs the input signal to the CPU 901. The user inputs various data or provides an instruction about a process operation to the information processing apparatus 10 by operating the input device 915. Additionally, the imaging device 933 described below may function as an input device by capturing an image of a motion of a hand of the user or a finger of the user. At this time, a pointing position may be determined on the basis of the motion of the hand or the orientation of the finger.

The output device 917 is a device visually or audibly notifies the user of the information acquired. For example, the output device 917 may be a display device, such as a liquid crystal display (LCD), a plasma display panel (PDP), an organic electro-luminescence (EL) display, or a projector, a hologram display device, a sound output device, such as a speaker or a headphone, or a printing device. The output device 917 outputs a result obtained through the process by the information processing apparatus 10 as a visual image such as texts or pictures, or a sound such as a voice or an audio sound. Additionally, the output device 917 may include a light for illuminating the surroundings.

The storage device 919 is a data storage device serving as a part of a storage unit of the information processing apparatus 10. For example, the storage device 919 includes a magnetic storage device such as a hard disk drive (HDD), a semiconductor storage device, an optical storage device, or a magneto-optical storage device. The storage device 919 stores programs to be executed by the CPU 901, various data, and various data acquired from the outside.

The drive 921 is a reader-writer for the removable recording medium 927 which may be a magnetic disk, an optical disk, a magneto-optical disk, or a semiconductor memory. The drive 921 is incorporated in the information processing apparatus 10 or is an external drive of the information processing apparatus 10. The drive 921 reads information stored in the removable recording medium 927 mounted and outputs the information to the RAM 905. Additionally, the drive 921 writes records on the removable recording medium 927 mounted.

The connection port 923 is a port for directly coupling a device to the information processing apparatus 10. For example, the connection port 923 may be a universal serial bus (USB) port, an IEEE 1394 port, or a small computer system interface (SCSI) port. Alternatively, the connection port 923 may be an RS-232C port, an optical audio terminal, or a high-definition multimedia interface (HDMI) (registered trademark) port. Coupling the external connection device 929 to the connection port 923 may cause the information processing apparatus 10 and the external connection device 929 to interchange various data therebetween.

The communication device 925 is a communication interface including a communication device for connection to a communication network 931, for example. For instance, the communication device 925 may be a communication card for a wired or wireless local area network (LAN), Bluetooth (registered trademark), or a wireless USB (WUSB). Alternatively, the communication device 925 may be an optical communication router, a router for an asymmetric digital subscriber line (ADSL), or a modem for various communications. For example, the communication device 925 sends/receives a signal to/from the internet or another communication device using a predetermined protocol such as TCP/PI. Additionally, the communication network 931 coupled to the communication device 925 is a wired or wirelessly connected network, such as the internet, home LAN, infrared communication, radio-wave communication, or satellite communication.

For example, the imaging device 933 is a device that images the real space using an imaging element, such as a charge coupled device (CCD) or a complementary metal oxide semiconductor (CMOS), and various members including a lens for controlling imaging of a subject image on the imaging element, and generates a captured image. The imaging device 933 may capture a still image or a moving image.

For example, the sensor 935 includes various sensors, such as a ranging sensor, an acceleration sensor, a gyroscopic sensor, a geomagnetic sensor, an optical sensor, or a sound sensor. The sensor 935 acquires information on the state of the information processing apparatus 10 itself, such as the attitude of a casing of the information processing apparatus 10, and information on the surrounding environment around the information processing apparatus 10, such as the brightness and noises in the surroundings of the information processing apparatus 10. Additionally, the sensor 935 may include a global positioning system (GPS) sensor that receives a GPS signal and measures the latitude, longitude, and altitude of the device.

5. Conclusion

As described above, according to the embodiments of the present disclosure, the information processing apparatus is provided that includes the display controlling section that causes the display device to start displaying the first virtual object while the user is moving in the real space, performs the distance keeping control to substantially keep the distance between the user and the first virtual object, ends the distance keeping control in a case where the predetermined condition is satisfied, and changes the distance between the user and the first virtual object. According to the configuration, it is possible to enhance noticeability of the virtual object.

Although some preferred embodiments of the present disclosure have been described in detail above with reference to the accompanying drawings, the technical scope of the present disclosure should not be limited to such examples. It is clear that those having ordinary knowledge in the art in the technical field of the present disclosure will easily arrive at various alterations or modifications within a scope of the technical idea described in the claims, and it is understood that these alternations or modifications naturally belong to the technical scope of the present disclosure.

For example, programs may be made that cause the hardware, such as the CPU, the ROM, or the RAM, incorporated in the computer to achieve functions substantially the same as the functions of the control unit 120 described above. Additionally, a computer-readable recording medium that stores these programs may be provided.

The position of each of the components are not particularly limited as long as the above-described operations of the information processing apparatus 10 are achieved, for example. A part or entire process performed by each of the components in the information processing apparatus 10 may be performed by a server apparatus (not shown). As a specific example, some or all blocks of the control unit 120 in the information processing apparatus 10 may exist in the server apparatus (not shown). For example, some or all of the context acquiring section 121, the interest determining section 122, the environment information acquiring section 123, and the display controlling section 129 in the information processing apparatus 10 may exist in the server apparatus (not shown).

Further, the effects described herein are merely illustrative or exemplary, and are not limitative. That is, the technique according to the present disclosure may achieve, in addition to or in place of the above effects, other effects that are obvious to those skilled in the art from the description of the present specification.

It is to be noted that the following configurations also belong to the technical scope of the present disclosure.

(1) An information processing apparatus including
  a display controlling section that
  causes a display device to start displaying a first virtual object while a user is moving in a real space,
  performs distance keeping control to substantially keep a distance between the user and the first virtual object,
  ends the distance keeping control in a case where a predetermined condition is satisfied, and
  changes the distance between the user and the first virtual object.

(2) The information processing apparatus according to (1) described above, in which the predetermined condition includes a condition that the user has come closer to a predetermined position in the real space.

(3) The information processing apparatus according to (2) described above, in which the first virtual object indicates information relevant to the predetermined position.

(4) The information processing apparatus according to (3) described above, in which the information relevant to the predetermined position includes information on a shop present at the predetermined position.

(5) The information processing apparatus according to any one of (1) to (4) described above, in which the display controlling section
  causes the display device to display the first virtual object substantially in front of the user on a basis of a determination that the user is moving, and
  changes, in a case where the predetermined condition is satisfied, an attitude of the first virtual object while moving the first virtual object away from a moving direction of the user.

(6) The information processing apparatus according to (5) described above, in which the display controlling section changes, in a case where the predetermined condition is satisfied, the attitude of the first virtual object to cause an angle defined between a front face of the first virtual object and the moving direction of the user to become small.

(7) The information processing apparatus according to any one of (1) to (6) described above, further including
  an interest determining section that determines whether or not the user has an interest in the first virtual object displayed, in which
  the display controlling section reduces the distance between the first virtual object and the user on a basis of a determination that the user has an interest in the first virtual object displayed.

(8) The information processing apparatus according to (7) described above, in which the interest determining section determines that the user has an interest in the first virtual object when a line of sight of the user has moved toward the first virtual object.
(9) The information processing apparatus according to (7) or (6) described above, in which the display controlling section changes the attitude of the first virtual object such that the attitude of the first virtual object relative to the user is maintained while reducing the distance between the first virtual object and the user.
(10) The information processing apparatus according to any one of (7) to (9) described above, in which the display controlling section reduces the distance between the first virtual object and the user in a case where a time or a distance in which the user is able to keep walking is greater than a threshold, the time and the distance in which the user is able to keep walking being determined on a basis of environment information.
(11) The information processing apparatus according to any one of (7) to (10) described above, in which the display controlling section increases an amount of information of the first virtual object while reducing the distance between the first virtual object and the user.
(12) The information processing apparatus according to any one of (7) to (11) described above, in which the display controlling section causes the display device to display a second virtual object in a case where a moving speed of the user decreases while the distance between the first virtual object and the user is reduced, the second virtual object being associated with the first virtual object.
(13) The information processing apparatus according to (12) described above, in which an amount of information of the second virtual object is greater than the amount of information of the first virtual object.
(14) The information processing apparatus according to (12) or (13) described above, in which the second virtual object includes navigation information based on a current position of the user and the predetermined position relevant to the first virtual object.
(15) The information processing apparatus according to any one of (1) to (14) described above, in which the first virtual object includes a notification object that notifies the user of reception of information by the information processing apparatus.
(16) The information processing apparatus according to any one of (1) to (15) described above, in which the display controlling section performs the distance keeping control to increase the distance between the user and the first virtual object as a moving speed of the user increases.
(17) The information processing apparatus according to any one of (1) to (16) described above, in which in a case where the display controlling section causes a plurality of the first virtual objects to be displayed, the display controlling section controls display timings or display positions of the plurality of the first virtual objects such that the plurality of the first virtual objects are not visually recognized by the user as being overlapped one another.
(18) The information processing apparatus according to any one of (1) to (17), in which the information processing apparatus is a head mounted display (HMD).

(19) An information processing method including:
causing a display device to start displaying a first virtual object while a user is moving in a real space;
performing distance keeping control to substantially keep a distance between the user and the first virtual object;
ending the distance keeping control in a case where a predetermined condition is satisfied; and
changing the distance between the user and the first virtual object.
(20) A program causing a computer to function as an information processing apparatus, the apparatus including
a display controlling section that
causes a display device to start displaying a first virtual object while a user is moving in a real space,
performs distance keeping control to substantially keep a distance between the user and the first virtual object,
ends the distance keeping control in a case where a predetermined condition is satisfied, and
changes the distance between the user and the first virtual object.

REFERENCE SIGNS LIST

10: information processing apparatus
20: user
31: real object
50: virtual object
51: front face
110: sensor unit
120: control unit
121: context acquiring section
122: interest determining section
123: environment information acquiring section
129: display controlling section
130: storage unit
131: virtual-object definition information
135: map information
140: communication unit
150: display unit

The invention claimed is:
1. A head-mounted display (HMD) comprising:
circuitry configured to
receive an image of a real space captured by a camera;
control a display to display a virtual object superimposed on the image of the real space;
perform distance keeping control to substantially maintain a distance between a position of the HMD in a virtual space and the virtual object in the virtual space; and
perform attitude keeping control of the virtual object such that a surface of the virtual object on which information is provided is substantially perpendicular to a direction from the position of the HMD in the virtual space to the virtual object in the virtual space.
2. The HMD of claim 1, wherein
the circuitry is configured to control the display to display the virtual object substantially in front of a user of the HMD in the virtual space.
3. The HMD of claim 1, wherein
the circuitry is configured to terminate the distance keeping control in a case that a condition is satisfied.
4. The HMD of claim 3, wherein
the condition includes a condition that a distance between a position of the HMD in the virtual space and a predetermined position in the virtual space is less than a predetermined distance.

5. The HMD of claim 3, wherein
the condition includes a condition that the virtual object is displayed in the virtual space for a predetermined period of time.

6. The HMD of claim 3, wherein
the condition includes a condition that the virtual object is displayed in the virtual space for longer than a predetermined period of time, and the circuitry is configured to detect motion of a hand of a user of the HMD.

7. The HMD of claim 1, wherein the circuitry is configured to:
detect behavior information of a user of the HMD.

8. The HMD of claim 7, wherein
the behavior information includes at least a history of actions of the user or biological information of the user.

9. The HMD of claim 7, wherein
the circuitry is configured to manipulate a visual appearance of the virtual object based on the detected motion of the hand of the user of the HMD.

10. The HMD of claim 1, wherein
the circuitry is configured to detect motion of a hand of a user of the HMD.

11. The HMD of claim 10, wherein
the circuitry is configured to determine a pointing position based on the detected motion of the hand of the user of the HMD.

12. The HMD of claim 1, wherein
the circuitry is configured to detect motion of a hand of a user of the HMD based on an image of the hand of the user captured by the camera.

13. The HMD of claim 1, wherein
the circuitry is configured to detect a real object from the image of the real space.

14. The HMD of claim 13, wherein
the circuitry is configured to determine a relative position of the HMD in relation to the real object.

15. The HMD of claim 1, wherein
the circuitry is configured to detect a line of sight of a user of the HMD based on an image of an eye of the user.

16. The HMD of claim 1, wherein
the HMD is a see-through HMD.

17. The HMD of claim 1, wherein
the circuitry is configured to control the display to adjust a position of the virtual object in the virtual space so that the virtual object remains in front of a user of the HMD in the virtual space when the user changes an orientation of the user's head.

18. A method performed by a head-mounted display (HMD), the method comprising:
controlling a display to display a virtual object superimposed on an image of a real space captured by a camera of the HMD;
performing distance keeping control to substantially maintain a distance between a position of the HMD in a virtual space and the virtual object in the virtual space; and
perform attitude keeping control of the virtual object such that a surface of the virtual object on which information is provided is substantially perpendicular to a direction from the position of the HMD in the virtual space to the virtual object in the virtual space.

19. One or more non-transitory computer-readable media including computer program instructions, which when executed by circuitry of a head-mounted display (HMD), cause the circuitry to:
control a display to display a virtual object superimposed on an image of a real space captured by a camera of the HMD;
performing distance keeping control to substantially maintain a distance between a position of the HMD in a virtual space and the virtual object in the virtual space; and
perform attitude keeping control of the virtual object such that a surface of the virtual object on which information is provided is substantially perpendicular to a direction from the position of the HMD in the virtual space to the virtual object in the virtual space.

20. A head-mounted display (HMD) comprising:
a camera configured to detect an image of a real space; and
circuitry configured to
control a display to display the image of the real space captured by the camera;
control the display to display a virtual object superimposed on the image of the real space;
control the display to display the virtual object so as to maintain a consistent distance between a position of the HMD in a virtual space and the virtual object in the virtual space; and
control the display to display the virtual object such that a surface of the virtual object is consistently perpendicular to a direction from the position of the HMD in the virtual space to the virtual object in the virtual space.

* * * * *